United States Patent [19]
Goldstein et al.

[11] Patent Number: 6,124,846
[45] Date of Patent: Sep. 26, 2000

[54] POINTING DEVICE WITH ERGONOMIC FEATURES

[75] Inventors: Mark R. Goldstein; Elizabeth Cecelia Goldstein, both of New York, N.Y.

[73] Assignee: Midas Mouse International Pty. Ltd., Melbourne, Australia

[21] Appl. No.: 09/266,168

[22] Filed: Mar. 10, 1999

Related U.S. Application Data

[63] Continuation of application No. 08/925,831, Sep. 5, 1997, which is a continuation-in-part of application No. 08/513,105, Aug. 9, 1995, Pat. No. 5,726,683, which is a continuation-in-part of application No. 29/072,206, May 30, 1997, Pat. No. Des. 399,835.

[51] Int. Cl.[7] ................................................ G09G 5/08
[52] U.S. Cl. ............................................................ 345/163
[58] Field of Search ................................... 345/163, 156, 345/157

[56] References Cited

U.S. PATENT DOCUMENTS

| D. 305,650 | 1/1990 | Lin .................................... | D14/114 |
|---|---|---|---|
| D. 328,597 | 8/1992 | Clouss ............................... | D14/114 |
| D. 330,706 | 11/1992 | San-Yih ............................ | D14/114 |
| D. 336,900 | 6/1993 | Pfeifer .............................. | D14/114 |
| D. 337,321 | 7/1993 | Koh et al. ........................ | D14/114 |
| D. 338,881 | 8/1993 | Soma ................................. | D14/114 |

(List continued on next page.)

FOREIGN PATENT DOCUMENTS

| 0 453 587 A1 | 10/1991 | European Pat. Off. . |
|---|---|---|
| 2698986 | 6/1994 | France . |
| 37 05 492 | 8/1987 | Germany . |
| 93 12 224 | 10/1993 | Germany . |
| 44 00 790 A1 | 5/1995 | Germany . |
| 63282827 | 11/1988 | Japan . |
| 08069352 | 3/1996 | Japan . |
| 92/14235 | 8/1992 | WIPO . |
| 94/27207 | 11/1994 | WIPO . |
| 97/06480 | 2/1997 | WIPO . |
| WO 97/06480 | 2/1997 | WIPO . |
| 97/08679 | 3/1997 | WIPO . |

OTHER PUBLICATIONS

"3–Dimensional Mouse" IBM Technical Disclosure Bulletin, US, IBM, Corp. New York, vol. 36, No. 8, Aug. 1, 1993, XP00390182, ISSN: 0018–8689, pp. 171–173.

Armstrong, Thomas J. et al. "Analysis of Jobs for Control of Upper Extremity Cumulative Trauma Disorders", Proceedings of the 1984 International Conference on Occupational Ergonomics, The University of Michigan, Ann Arbor, Michigan, pp. 416–420.

(List continued on next page.)

*Primary Examiner*—Matthew Luu
*Assistant Examiner*—Anthony J. Blackman
*Attorney, Agent, or Firm*—Zagorin, O'Brien & Graham, LLP

[57] ABSTRACT

An improved pointing device with ergonomic features is provided. The pointing device allows an operator's hand to remain in a relaxed position in as near a state of repose as possible while operating the pointing device. The shape of the pointing device reduces several of the known high risk postures during use.

84 Claims, 12 Drawing Sheets

U.S. PATENT DOCUMENTS

| | | | |
|---|---|---|---|
| D. 340,926 | 11/1993 | Lin | D14/114 |
| D. 343,392 | 1/1994 | Harden et al. | D14/114 |
| D. 348,057 | 6/1994 | Bradley | D14/114 |
| D. 349,280 | 8/1994 | Kaneko | D14/114 |
| D. 349,493 | 8/1994 | Cheng | D14/114 |
| D. 350,737 | 9/1994 | Chen | D14/114 |
| D. 354,484 | 1/1995 | Skaggs | D14/114 |
| D. 354,746 | 1/1995 | Colani et al. | D14/114 |
| D. 355,901 | 2/1995 | Bradley | D14/114 |
| D. 356,558 | 3/1995 | Montgomery et al. | D14/114 |
| D. 373,350 | 9/1996 | Verstockt | D14/114 |
| D. 381,970 | 8/1997 | Gasca | D14/114 |
| D. 383,453 | 9/1997 | Scenna et al. | D14/114 |
| D. 385,542 | 10/1997 | Kaneko et al. | D14/114 |
| D. 386,165 | 11/1997 | Tseng | D14/114 |
| D. 399,835 | 10/1998 | Goldstein et al. | D14/114 |
| 4,786,892 | 11/1988 | Kubo et al. | 340/365 R |
| 4,862,165 | 8/1989 | Gart | 345/20 |
| 5,157,381 | 10/1992 | Cheng | 340/710 |
| 5,252,970 | 10/1993 | Baronowsky | 341/20 |
| 5,260,696 | 11/1993 | Maynard, Jr. | 345/163 |
| 5,287,090 | 2/1994 | Grant | 345/163 |
| 5,296,871 | 3/1994 | Paley | 345/163 |
| 5,311,209 | 5/1994 | Lin | 345/165 |
| 5,340,067 | 8/1994 | Martin et al. | 248/118.5 |
| 5,355,147 | 10/1994 | Lear | 345/156 |
| 5,355,148 | 10/1994 | Anderson | 345/166 |
| 5,414,445 | 5/1995 | Kaneko et al. | 345/163 |
| 5,428,368 | 6/1995 | Grant | 345/163 |
| 5,473,344 | 12/1995 | Bacon et al. | 345/163 |
| 5,563,629 | 10/1996 | Caprara | 345/160 |
| 5,576,733 | 11/1996 | Lo | 345/163 |
| 5,648,798 | 7/1997 | Hamling | 345/163 |
| 5,657,051 | 8/1997 | Liao | 345/163 |
| 5,826,842 | 10/1998 | Paulse et al. | 248/118.1 |
| 5,841,425 | 11/1998 | Zenz, Sr. | 345/163 |

OTHER PUBLICATIONS

Rempel, David and Gerson, Jack, "Fingertip Forces While Using Three Different Keyboards", Proceedings of the Human Factors Society 35$^{th}$ Annual Meetings, University of Michigan, Ann Arbor, Michigan, 1991, pp, 253–255.

Tichauer, E.R., "Anatomy Applied to the Design of Work Situations", The Biochemical Basis of Ergonomics, John Wiley & Sons, 1978, pp. 99.

Tichauer, E.R., "Some Aspects of Stress on Forearm and Hand in Industry", Journal of Occupational Medicine, 1966, pp. 63–71.

Kumar, S. and Scaife, W.G.S., "A Precision Task, Posture, and Strain", Journal of Safety Research, Spring 1979, vol. 11, No. 1, pp. 28–36.

Ryan, G.A. et al., "The Prevalence of Repetition Injury in Data Process Operators", Proceedings of the 21$^{st}$ Annual Conference of the Ergonomics Society of Australia and New Zealand, Sydney, 1984, pp. 279–288.

Hägg Góran M., "A worksite method for shoulder muscle fatigue measurements using EMG, test contractions and zero crossing technique", Ergonomics, vol. 30, No. 11, 1987, pp. 1541–1551.

Hägg, Góran M., "Test Contractions and Zero Crossing Analysis of EMG; A Method for Investigating Work Related Muscular Disorders in the Shoulder Region", Department of Work Physiology, National Institute of Occupational Health, S–171 84 Solna, Sweden, pp. 387–389.

Lee, K.S. et al., "Physical Stress Evaulation of Microscope Work Using Objective and Subjective Methods", International Journal of Industrial Ergonomics, 2, 1988, pp. 203–209.

Goldstein, M., "EMG activity in muscles of pronation and ulnar deviation,"J Occup Health Safety—Aust NZ 1994, pp. 458–460.

CTD Resource Network, Inc., "Mark Goldstein Q&A Interview (Dec. 21, 1997)", http://www.tifaq.com/articles/goldtouch–dec97–mark goldstein.html (printed Dec. 28, 1998), pp. 1–3.

Emsworth, G., "Computer Mouse with Improved Gripping Surfaces", 2244 Research Disclosure, No. 348, Apr. 1993.

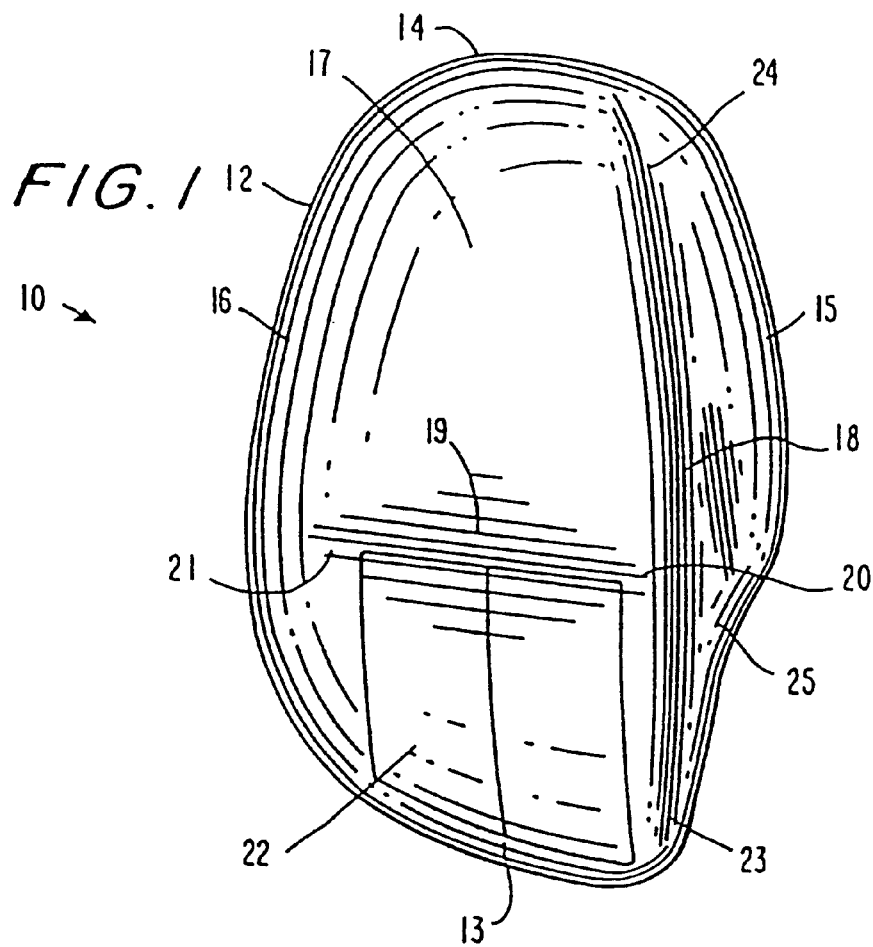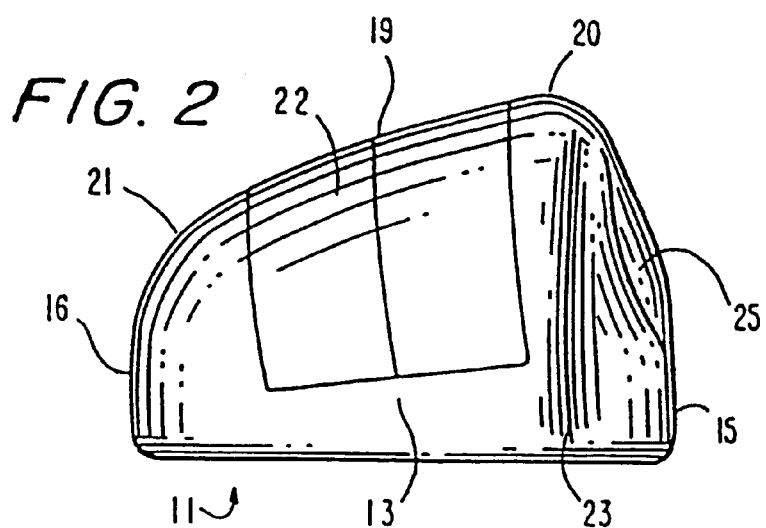

POINTING DEVICE WITH ERGONOMIC FEATURES

This application is a continuation of application Ser. No. 08/925,831, filed Sep. 5, 1997, which was itself a continuation-in-part of (1) application Ser. No. 08/513,105, filed Aug. 9, 1995, now U.S. Pat. No. 5,726,683 and (2) Design Patent Application No. 29/072,206, filed May 30, 1997, now U.S. Pat. No. Des. 399,835. U.S. application Ser. Nos. 08/925,831 and 08/513,105 are each incorporated in their entirety herein by reference.

BACKGROUND

1. Field of the Invention

The present invention relates to pointing devices often used in conjunction with a computer. In one realization thereof, present invention relates to a pointing device conventionally referred to as a mouse.

2. Description of the Related Art

Computers are usually equipped to use a mouse for controlling the movement of the cursor. Computer mice employ mechanical, optical or other means to control the displacement of a cursor on a computer screen. By moving the mouse across a flat surface along two axes, the cursor is proportionally moved across the computer screen. Mouse usage is coming under increasing scrutiny because while providing the computer user with considerable flexibility over the motion of the cursor on the computer screen, extended or repeated use of the mouse can result in severe physical strain. This physical strain develops because, for the hand, even the smallest of postural shifts can increase or decrease stresses on the hand and fingers. Previously, mice were designed without sufficient consideration for the best postures of the fingers, wrist and forearm. The reported number of mouse over-use related injuries are increasing and in some industries the injury rates rival and even surpass those of keyboard related injuries. These injuries are collectively referred to as repetitive stress injuries (RSI).

The areas of the body most vulnerable to repetitive stress injuries are the soft tissues of the fingers, wrists and shoulders. More specifically, the index finger and its knuckle joint, the tendons responsible for extending and flexing the two button fingers (index and middle) and the muscles of the shoulder which abduct, support and are responsible for extension and flexion of the arm during mouse usage. Excessive wrist extension, particularly when associated with radial and ulnar deviation, is also linked to long term tendon and nerve damage. Additionally, current mouse design provides no position for the user to rest the hand without removing the hand from the mouse and the concomitant return of the hand to the mouse. This constant activation of the shoulder muscle and joint is extremely harmful and can lead to long term damage.

Index finger abduction in normal mice results from the combination of several factors. The need to grip the mouse with the ring and little fingers in opposition to the thumb, effectively tethers the ring finger to the side of the mouse. Consequently the movement of the index finger is greatly restricted and forced into a state of continual abduction as a consequence of the linkage to the ring finger. This configuration also forces the thumb and ring and little fingers into constant contraction. Additionally, by necessity, the ring finger is placed on the side of the mouse and can't be moved to what would be a natural position because of the possibility of actuating the right button. This position, causes a myriad of problems including:

a) Restriction of the movement of the index finger to the left button, which necessitates pronation of the entire forearm to accomplish.

b) Restriction of the movement by the fingers and a limitation on the range of fine control. This necessitates a shift of movement activation from the fingers to the wrist and shoulder.

c) The right button position on conventional mice doesn't allow alternative grip positions with the ring finger thereby exacerbating the strain imposed on all fingers.

d) Excessive pronation of the forearm while using conventional mice is almost unavoidable. The low position of left button combined with tethering the ring finger to the right side of the mouse forces excess pronation. Usually, the left button slopes away to the left exacerbating the problems.

e) By providing only one position for thumb placement with no alternative, pronation is necessarily enforced.

The width of the mouse and the placement of the left button exacerbates the problem further by placing stress on the ring finger's joint and its tendons. To worsen the situation, the index and middle fingers are either in constant extension in readiness to actuate the button or levering at the joint to depress the button, thereby forcing the muscles of the two fingers into a state of either constant contraction or constant repetitive motion. This causes stress of the tendons and muscles in the forearm.

There have been several attempts to solve these problems. Mice have been designed with palm knobs and enlarged square ends. These designs, however, aggravate the above identified problems. The thumb and ring finger are brought into constant contraction and require the continual extension of the index and middle fingers over the activating buttons causing stress of the tendons in the forearm. As with other mouse designs, the ring finger is necessarily placed on the side of the mouse, leading to the myriad of problems outlined above.

Additionally, pronation of the hand is increased. By elevating the palm, the left stretch of the forefinger is increased and more reach is required thereby necessitating increased pronation. While these designs may provide some hand support, there is no finger extensor relief and they restrict fine finger control.

Alternatively, mice have been designed which support the entire hand, but don't provide the normal detrimental grip. These designs have a variety of shortcomings as well. They take away fine finger control thereby requiring all fine movement to occur at the wrist or shoulder. These pushing, pulling and lateral side-to-side movements are generated at the wrist or shoulder. Continual use of such devices could lead to injuries to these two vulnerable areas. These mice also are difficult or impossible to use in an intermittent fashion due to the necessity of gripping, positioning, removing and returning the operator's hand, and may lead to decreased productivity in some applications.

Lastly, some mice have been designed to have specific hand shaped ergonomics. While these mice provide comfortable positions in which to rest the hand, it is difficult to use these mice in the usual intermittent fashion with just the fingers. The pivot point, or anchor, for mouse designs such as these is no longer the wrist as found in conventional mice, therefore fine control is reduced. This design also shifts much of the fine control initiation to the shoulder, again creating the possibility of long term damage to the shoulder. Such specific hand shaped mice also will not accommodate a variety of hand sizes, necessitating the production and marketing of an excessively large variety of sizes in both left and right hand configurations. These designs generally lack proper surfaces for mouse movement using just the fingers.

SUMMARY

In view of the foregoing disadvantages inherent in the known types of computer mouse apparatus now present in the prior art, the present invention relates to an improved ergonomic pointing device that in one realization includes a computer mouse. Neutral hand posture, also known as the position of "repose," is the most relaxed and unstrained position for the hand. In this position, little muscle activity is present in the hand, wrist or forearm. The position of repose for the hand is with fingers slightly cupped and a little splayed, with the thumb forming a "C" shape with the index finger. The amount of pronation varies within individuals but should be in the range of 10 degrees to 45 degrees from the horizontal. This position is easily observed in a weightless environment, for example, while the hand is relaxed and suspended in a bath or swimming pool. Accordingly, a general purpose of the present invention, which will be described subsequently in further detail, is to provide a new and improved ergonomic computer mouse which places the hand in as near a state of repose as possible while manipulating the mouse and simultaneously improves finger mobility. The shape of the improved ergonomic mouse reduces several of the known high risk postures during mouse use and allows the continual shifting of postures so as to reduce the effect of continuous repetitive motion due to the unloading of vulnerable muscles, joints and tendon groups. This shape also provides a resting position for the hand, reducing stress in wrist extensors and finger extensors.

The shape of the improved ergonomic mouse is such that the pronation of the wrist and hand can be reduced from 0 degrees from the horizontal, wherein the plane defined by the face of the operator's palm is nearly parallel to the surface the mouse is resting upon, to approximately 80 degrees from the horizontal, wherein the same plane is nearly perpendicular to the surface upon which the mouse rests. This shape, which allows the reduction of pronation, also allows the hand, and the entire forearm to rest on the desk surface thereby alleviating the pressure usually exerted on the wrist. Shoulder abduction and contraction of the shoulder muscles are minimized and the forearm muscles responsible for pronation may be relaxed entirely. The shape allows the fingers to curl comfortably and be supported rather than requiring the finger extensors to be held in a constant state of contraction, thus reducing the tension of the tendons.

Accordingly, objects of this invention that are addressed by an improved ergonomic mouse include:

a) providing better, less stressful, finger placement;

b) allowing hand release by providing the ring finger with alternative resting and grasping surfaces while avoiding activation of the right button;

c) allowance for decreased pronation of the wrist and hand;

d) allowing greater range of finger movement by releasing the ring finger from the tethered position encountered when using conventional mice;

e) improved design for hand and finger relaxation, control and movement; and f) allowing natural curvature of fingers, thereby reducing or eliminating finger extension stresses.

Additional objects of this invention include providing a mouse that allows resting the operator's hand on its side while using the mouse; providing a pen grip for very fine and relaxed control; providing button positions that allow their activation in line with finger travel; reducing load on the operator's entire limb; providing a correct pivot (anchor) point to control mouse movement; reduction or elimination of the static load on the fore and middle fingers (extensors) normally encountered while using conventional mice; providing a hand position in which the ring finger opposes the thumb muscle (thenar eminence) while allowing for a resting position of the hand on top of the mouse, thereby facilitating relaxation of the wrist extensors and finger extensors while decreasing pronation by approximately 25 degrees and in the range of 20 degrees to 30 degrees.

To achieve these goals, the improved computer mouse provides an ergonomically correct design. The mice of the prior art are generally too narrow and necessarily require the thumb, ring and little fingers to hold the mouse while extending the fore and middle (button) fingers in anticipation of actuation. The improved ergonomic mouse allows a wider, more relaxed grip in the normal mouse position than experienced with prior art mice and provides for an even more relaxed grip in alternative positions made possible by the design thereof.

The following description of the improved ergonomic mouse relates to a mouse for right handed use. It is understood by the inventors that this invention can be adapted for left handed individuals by making a mirror image of the mouse described herein.

The improved ergonomic mouse raises and supports the fingers (medial phalanx support) under the index finger joint (knuckle) and slopes away toward the little finger. The improved ergonomic mouse incorporates two negative slopes over approximately the rear two thirds of the mouse. One slopes the mouse down longitudinally from front to back and the other slopes the mouse laterally from side to side. The negative lateral slope may be from left to right or from right to left depending on whether the mouse is for a left or right handed user. The two negative slopes provide a small rear right corner which allows for a low approach while still supporting the fingers at the proximal phalanges. This low approach combined with the 20 degrees to 30 degrees lateral elevation reduces the stress of supporting the wrist in a position of extension. The negative slope from the left side to the right side also improves the grip and reduces pronation. This support cups the fingers into a naturally unstressed position, a position which is very similar to natural hand posture which is readily observed when resting the forearm on a desk surface. By allowing this shape to be maintained in all grip positions the fingers are allowed to actuate the buttons in a trigger finger action rather than levering the metacarpo-phalangeal joint (knuckle). This is quite different from the usual mouse designs which raise the palm of the hand and force simultaneous extension and contraction of the finger extensors.

The improved ergonomic mouse incorporates several unique features that aid in reducing the stress of the fingers and wrist. For the thumb there is a contoured smooth surface extending from the forward bottom section of the mouse to the top of the phalanx support. This allows the user to change grips from the normal position or with the hand resting on the mouse to the most comfortable grip wherein the operator's hand is rested on its side (on little finger) and cupping the mouse in a supported resting posture on the desk surface. The mouse or other surface can still be used in the usual manner with the wrist resting on the desk and the fingers achieving the mouse movements. This usage is still better than the normal mouse.

The design of this mouse also allows a fine pinch or pencil grip at the front left corner and left button while in the side rested position. This position also reduces wrist extension and finger extension while relaxing the entire limb and decreasing shoulder abduction.

Other features aiding in stress reduction include a straight, flattened surface for the ring and little fingers on the right side, opposite the thumb; a section on the front upon which the ring finger can rest and against which the ring finger can push the mouse in against the palm; a smooth rounded palm surface to create a grip triangle with the ring, little finger and the surfaces in contact with the muscles of the thenar and hypothenar eminence to control the mouse within and around the palm of the hand. Also, by allowing the mouse to be gripped between the thumb muscle (thenar eminence) and the ring finger, the thumb and little finger are released from gripping the mouse. Computer mice of the prior art which enforce a hand position requiring the thumb to be in nearly the same plane as the palm of the hand. In stark contrast, the improved ergonomic mouse separates the thumb from the fingers and allows the thumb to position itself in opposition to the fingers allowing for the relaxation of the thumb flexars and adductors. This results in the "C" formed by the thumb and the forefinger.

Some improved ergonomic mouse configurations in accordance with the present invention also allow alternative grips, each of which is beneficial to the user in comparison with the grips provided by prior art mice. One position for holding the mouse is the "normal grip", whereby the user approaches the mouse from the top, grasping one side with the thumb in opposition to the ring and little finger grasping the opposite side. Normal button actuation is achieved with the fore and middle fingers. However, as discussed above, the low approach provided by the improved ergonomic mouse combined with the proximal phalangeal support reduces the stress of supporting the wrist while the stress of constant extension of the button fingers is decreased by the curvature of the front surface. Alternatively, the mouse may be gripped by resting the hand directly on the mouse in a cupped comfortable position. This cupped position allows the hand to rest on the mouse without activating the buttons because the support provided by the phalanx support bears the weight of the fingers and hand rather than the extensor muscles and tendons. This resting position facilitates relaxation of the wrist extensors as well as the finger extensors while reducing pronation of the hand by approximately 20 degrees to 30 degrees in comparison with typical prior art mice.

Some prior art mice have too large a palm knob which requires more reach and greater left stretch of the index finger thereby increasing pronation. Other prior art mice lift the hand so that it is supported by the mouse itself. Either design is potentially injurious as each transfers the origin of all fine movements from the fingers and wrist to the elbow and shoulder. In contrast, the pivot point for mouse control for the improved ergonomic mouse is either the heel of the hand when the mouse is gripped in the normal position, or the side of the hand when the user's hand is resting on the side. Establishing the pivot point for mouse control at either location benefits the user by eliminating the transfer of fine movements to the shoulder. These design features facilitate the reduction of the load in the entire limb of the operator, thereby minimizing the strain and stress of mouse usage. Additionally, the overall curvature of the mouse is such that the hand grips it in alignment parallel with the cursor movement.

The buttons, of which there can be 1, 2 or three depending on the need of the operator, are positioned such that the ring and middle fingers can press the buttons in all grip positions without lateral movement. The ring finger is also able to rest on a surface next to the right button if so desired. In this position, the ring finger can provide alternative grip, opposing the palm of the hand and also the thenar eminence.

The buttons are positioned to allow easy and perpendicular actuation from all grip positions. The slope of the buttons is shaped so as to allow a relaxed rather than extended posture. This is accomplished by moving them closer to the ring finger and by having a greater negative slope of the buttons reducing finger extension and allowing a cupping of the hand. Most importantly, releasing the ring finger from its normal position, dramatically reduces stresses on the index finger in abduction and extension normally encountered during mouse use. The release of the ring finger can also bring about a 50 to 100 percent improvement in the range of mouse movement, thus allowing greater fine control of the mouse without transferring the movement to the wrist or shoulder or both.

Reduced static load on the finger buttons is achieved by providing phalanx support and the curved shape of the mouse which allows unstressed cupping of hand rather than the continuous stressful extension of fingers.

An alternative embodiment in accordance with the present invention is provided by the inventors. Current computer mice control the cursor in two dimensions only. Defining the X axis as left to right on the screen and the Z axis as up and down on the screen, current mice are limited to controlling the cursor in the XZ plane. By replacing one of the buttons of the mouse described above with a pointing nib or forward/back button the mouse of the present invention is capable of controlling the cursor in three dimensions. While the mouse will control the cursor in the XZ plane as usual, the pointing nib will control the cursor along the Y axis, which is along the longitudinal axis from front to rear of the screen. The planar controls can be designated in any configuration which is desirable. The pointing nib can control the cursor along the Y, X or Z axes, while the cursor's location along the remaining two axes is controlled by the traditional mouse means.

BRIEF DESCRIPTION OF THE DRAWINGS

The present invention may be better understood, and its numerous objects, features, and advantages made apparent to those skilled in the art by referencing the accompanying drawings.

FIG. 1 is top perspective view of an ergonomic mouse in accordance with the present invention.

FIG. 2 is a front perspective view of an ergonomic mouse in accordance with the present invention.

DESCRIPTION OF THE PREFERRED EMBODIMENT(S)

Figure 3:
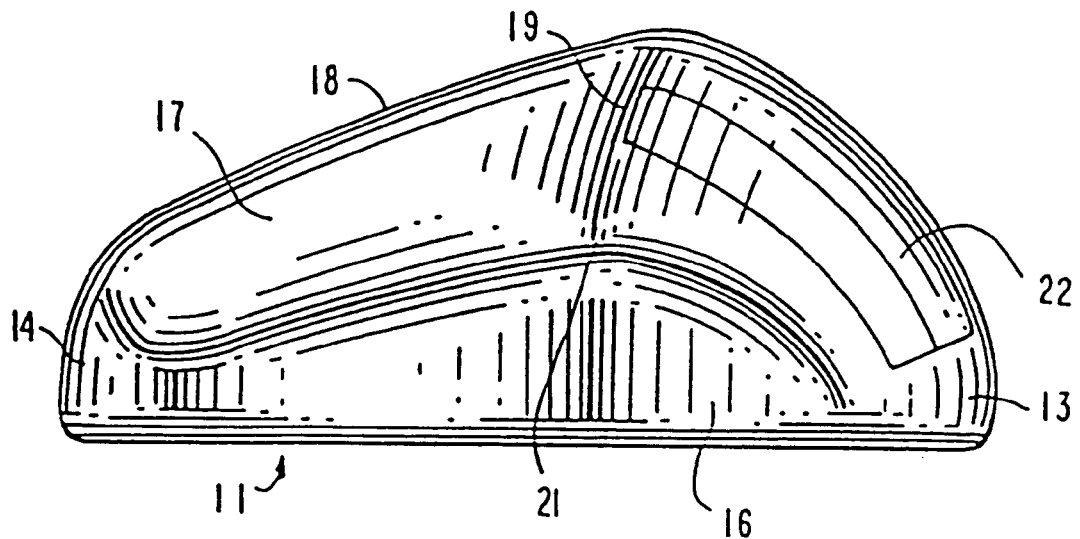
FIG. 3 is a side perspective view of an ergonomic mouse in accordance with the present invention.

With reference now to the drawings and in particular to FIGS. 1–4 thereof, a new and improved ergonomic computer mouse embodying the principles and concepts of the present invention and generally designated by the reference numeral 10 will be described.

Figure 4:
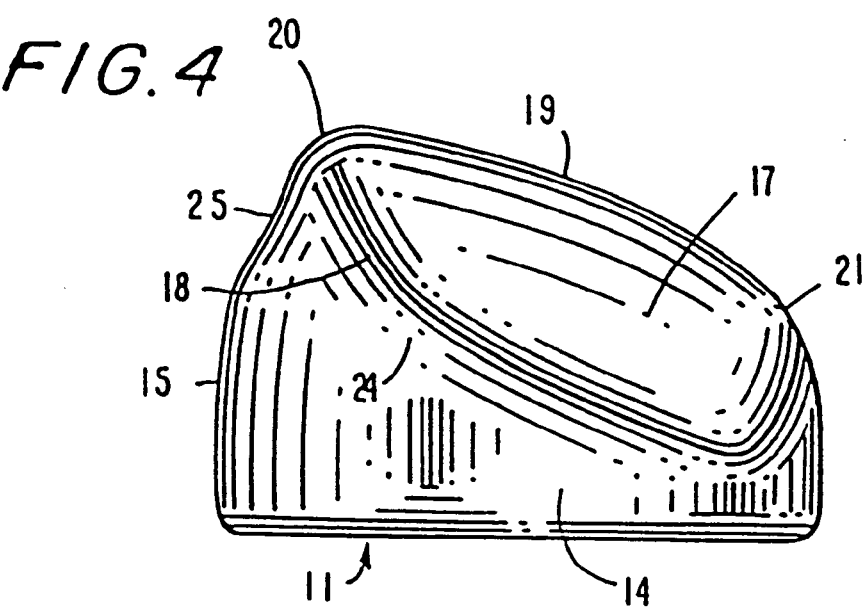
FIG. 4 is a rear perspective view of an ergonomic mouse in accordance with the present invention.

Ergonomic computer mouse 10 includes a planar bottom wall 11 with appropriate openings to accommodate the components of mechanical, optical or other means for controlling the movement of the cursor on the computer screen. A housing 12 extends from the bottom wall 11 approximately orthogonally oriented relative thereto. The housing 12 is defined by a substantially vertically rising front surface 13, a substantially vertically rising rear surface 14 and two substantially vertically and substantially parallel rising side surfaces 15, 16. The side surfaces 15, 16 are joined to opposite lateral sides of the substantially vertically rising front surface 13 at their forward vertical edges. The side surfaces 15, 16 are also joined to opposite lateral sides of the substantially vertically rising rear surface 14 at their rear vertical edge. A top surface 17 is attached along its outer edge to the front 13, rear 14, and sides 15, 16 substantially vertically rising surfaces along their top edge. The top surface 17 as shown in FIG. 4 has a negative slope from left to right when viewed from behind. In addition, the top surface 17 as shown in FIG. 3 has a negative slope from front to rear when viewed from the side.

Ergonomic computer mouse 10 is of a smooth, curved design. It is therefore understood that the top, side, front and rear surfaces are smoothly joined together. It is therefore further understood that the description of the mouse will be best understood to those skilled in the art by reference to the attached figures.

The overall curvature of the housing 12 is such that the housing fits comfortably in the palm of the hand of the operator while providing a variety of ergonomically advantageous grips. Two of the beneficial ergonomic grips provided by ergonomic computer mouse 10 include a normal approach from the top, while grasping one side 15 with the thumb in opposition to the ring and little finger, grasping the opposite side 16 and a grip wherein the operator's hand is resting on the little finger of the hand and cupping the mouse in a supported resting posture. As shown in FIG. 1, there is a peak or ridge 18 running from front to back oriented to lie under the operator's thenar eminence providing support thereto and a surface through which the operator can push the mouse with his/her thenar eminence. The peak 18 also provides a continuous surface for the thumb to move the mouse when the operator's hand is resting on its side in the beneficial side grip position. The thumb can be moved from the desk surface up the side surface 15 as the operator's hand is rotated to rest on its side. The peak 18 gives the final purchase for the thumb in this side grip position. As shown in FIGS. 1 and 2 the forward region of side 15 has a recessed region 25 for receiving the operator's thumb. Recessed region 25 is oriented to receive the operator's thumb in both the "normal" over the top grip position and the beneficial side grip position. The recessed region 25 provides a grip surface in both grip orientations and allows the operator's thumb to lie in opposition to the fore and middle fingers thus providing a pencil grip position which is beneficial for fine control of the mouse. As shown in FIGS. 1 and 4, longitudinal peak 18 runs from approximately the juncture 23 of the bottom planar wall 11, the substantially vertical rising left surface 15 and substantially vertically rising front surface 13 up the face of substantially vertically rising front surface 13 and along the length of the mouse to the juncture 24 of the top surface 17, the substantially vertical left surface 15 and substantially vertically rising rear surface 14. When viewed from behind, as in FIG. 4, the negative slope from left to right ranges from 20 degrees to 30 degrees. The angle of this slope is dependent on the respective heights of the substantially parallel lateral sides, 15, 16 and the overall width of the housing 12. When viewed from the side as in FIG. 3, the angle of negative slope from front to rear ranges from 15 degrees to 30 degrees and is dependent upon respective heights of the substantially vertical front surface 13 and substantially vertical rear surface 14 and the overall lengths of the housing 12. As shown in FIGS. 1 and 3, an elongated ridge 19 runs laterally from the juncture 20 of the top surface 17, the substantially vertically rising left surface 15 and substantially vertically rising front surface 13 and runs to the juncture 21 of the top surface 17, the substantially vertically rising right surface 16 and substantially vertically rising front surface 13. The elongated ridge 19 is oriented such that it provides support for the operator's proximal phalanges.

Top surface 17, ridge 18 and ridge 19 form a support surface upon which the operator's hand can rest comfortably on the mouse with 20 degrees to 30 degrees reduced pronation, in comparison with conventional mice, to give another ergonomically advantageous grip.

At least one to three buttons, and preferably two buttons 22 are located on the substantially vertical front surface 13. These buttons 22 are extended from substantially near the bottom of the substantially vertical front surface 13 to the front area of the top surface 17. When viewed from the front along the longitudinal axis of the mouse, as in FIG. 2, the buttons 22 are rotated approximately 0 degrees to 30 degrees in a counterclockwise direction. When viewed from the side along the lateral axis of the mouse, as in FIG. 3, the buttons are rotated approximately 20 degrees to 45 degrees in a counterclockwise direction thereby sloping the buttons rearwardly. These angles may vary over the length of the button, increasing or decreasing the slope of the button from one end to the other. This orientation of the buttons allows the buttons to lie under the operator's index and middle fingers when the operator's hand is in approximately the repose position.

Figure 11:
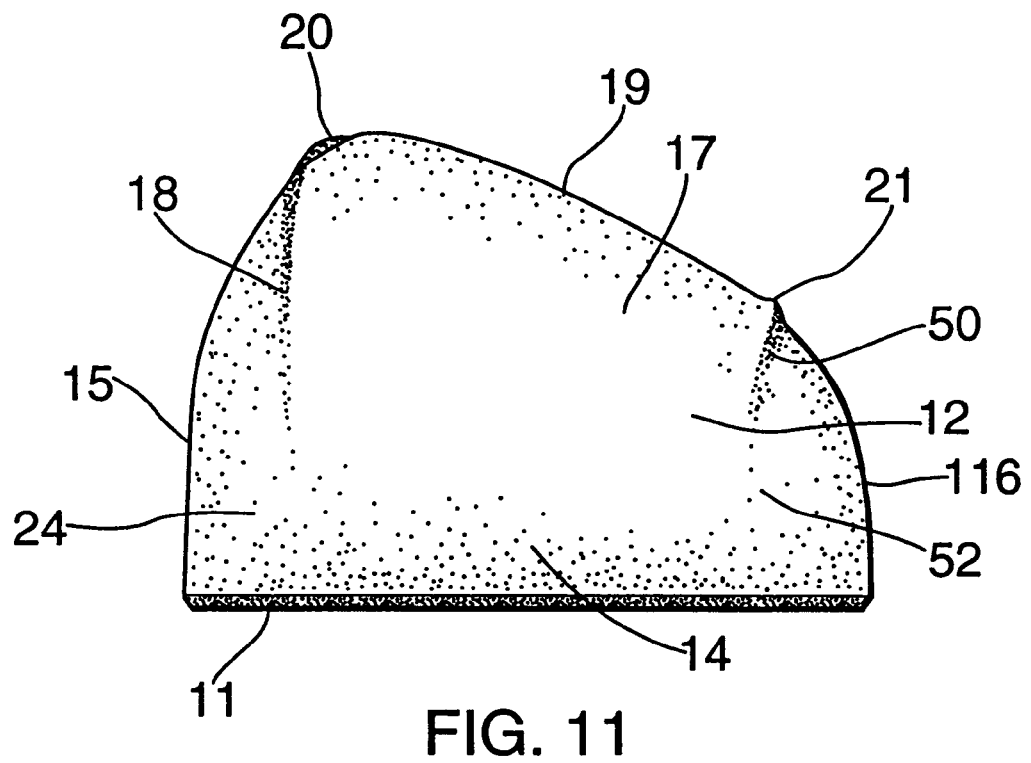
FIG. 11 is a rear elevation view of the embodiment of FIG. 9.
Figure 12:
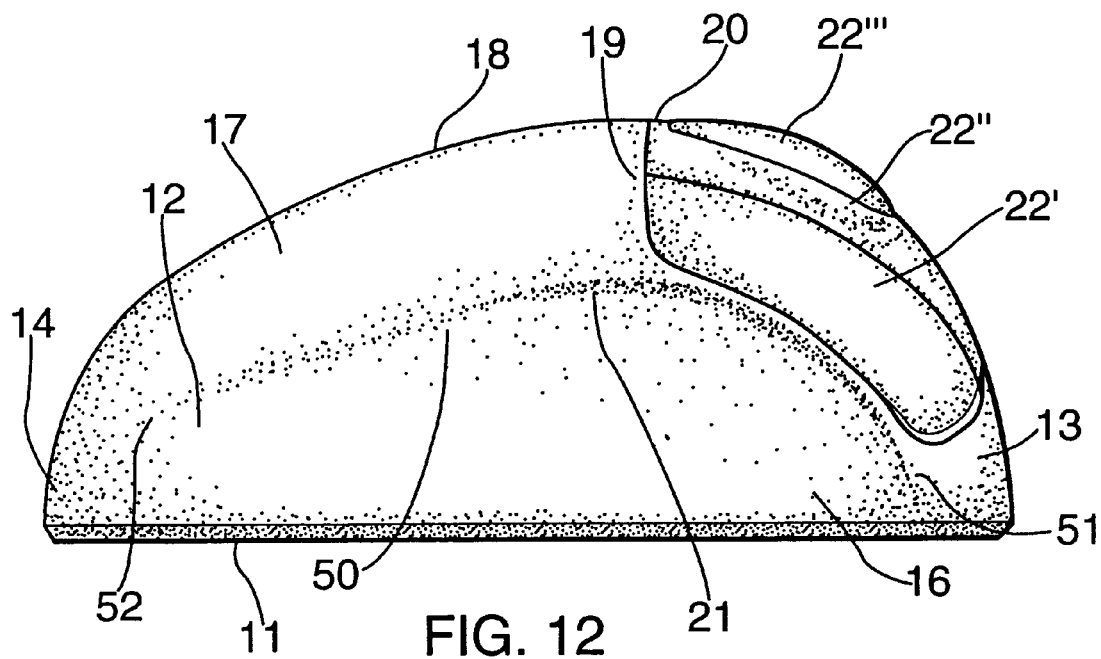
FIG. 12 is a right side elevation view of the embodiment of FIG. 9.
Figure 13:
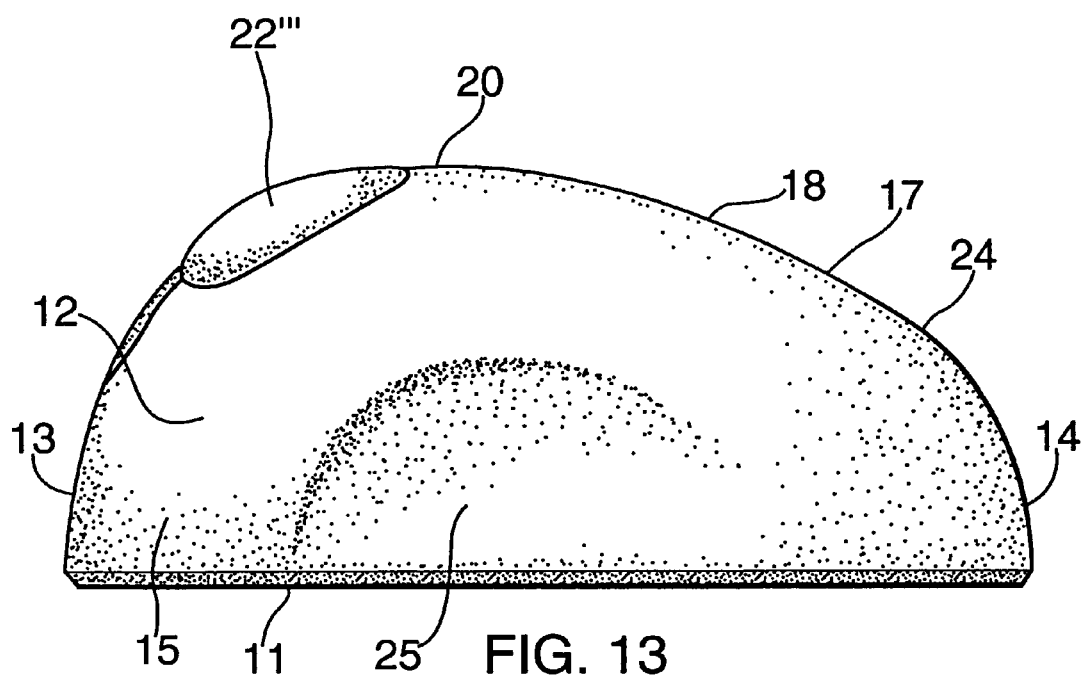
FIG. 13 is left side elevation view of the embodiment of FIG. 9.

FIGS. 9–14 show a right-handed version of a second embodiment in accordance with the present invention, in which features common to features in the embodiment of FIGS. 1–4 are labeled with common reference numerals. The ergonomic computer mouse 110 of the FIGS. 9–14 includes a planar bottom wall 11 with appropriate openings to accommodate the components of mechanical, optical or other device for controlling the movement of the cursor on the computer screen. A housing 12 extends from the bottom wall 11 approximately orthogonally oriented relative thereto. The housing 12 is defined by a front surface 13, a rear surface 14 and two rising side surfaces 15, 16. The side surfaces 15, 16 are joined to opposite lateral sides of the front surface 13 at their forward edges. The side surfaces 15, 16 are also joined to opposite lateral sides of the rear surface 14 at their rear edges. A top surface 17 is attached along its outer edge to the front 13, rear 14, and side 15, 16 surfaces along their top edge. The top surface 17 as shown in FIG. 11 has a negative slope from left to right when viewed from behind. In addition, the top surface 17 as shown in FIG. 13 has a negative slope from front to rear when viewed from the side.

The mouse of FIGS. 9–14 is of a smooth, curved design. The top, side, front and rear surfaces are smoothly joined together. As with the embodiment of FIGS. 14, in the embodiment of FIGS. 9–14, the overall curvature of the housing 12 is such that the housing fits comfortably in the palm of the hand of the operator while providing similar ergonomically advantageous grips. These grips include a normal approach from the top, while grasping one side 15 with the thumb in opposition to the ring and little finger, which grasp the opposite side 16, and a grip wherein the operator's hand is resting on the little finger of the hand and cupping the mouse in a supported resting posture. As shown in FIG. 11 there is a peak 18 running from front to back oriented to lie under the operator's thenar eminence providing support thereto and a surface through which the operator can push the mouse with his/her thenar eminence. The peak 18 also provides a continuous surface for the thumb to move the mouse when the operator's hand is resting on its side in the beneficial side grip position. The thumb can be moved from the desk surface up the side surface 15 as the operator's hand is rotated to rest on its side. The peak 18 gives the final purchase for the thumb in this side grip position. As shown in FIG. 13, the side 15 has a recessed region 25 for receiving the operator's thumb. Recessed region 25 is oriented to receive the operator's thumb in both the "normal" over the top grip position and the beneficial side grip position.

Figure 14:
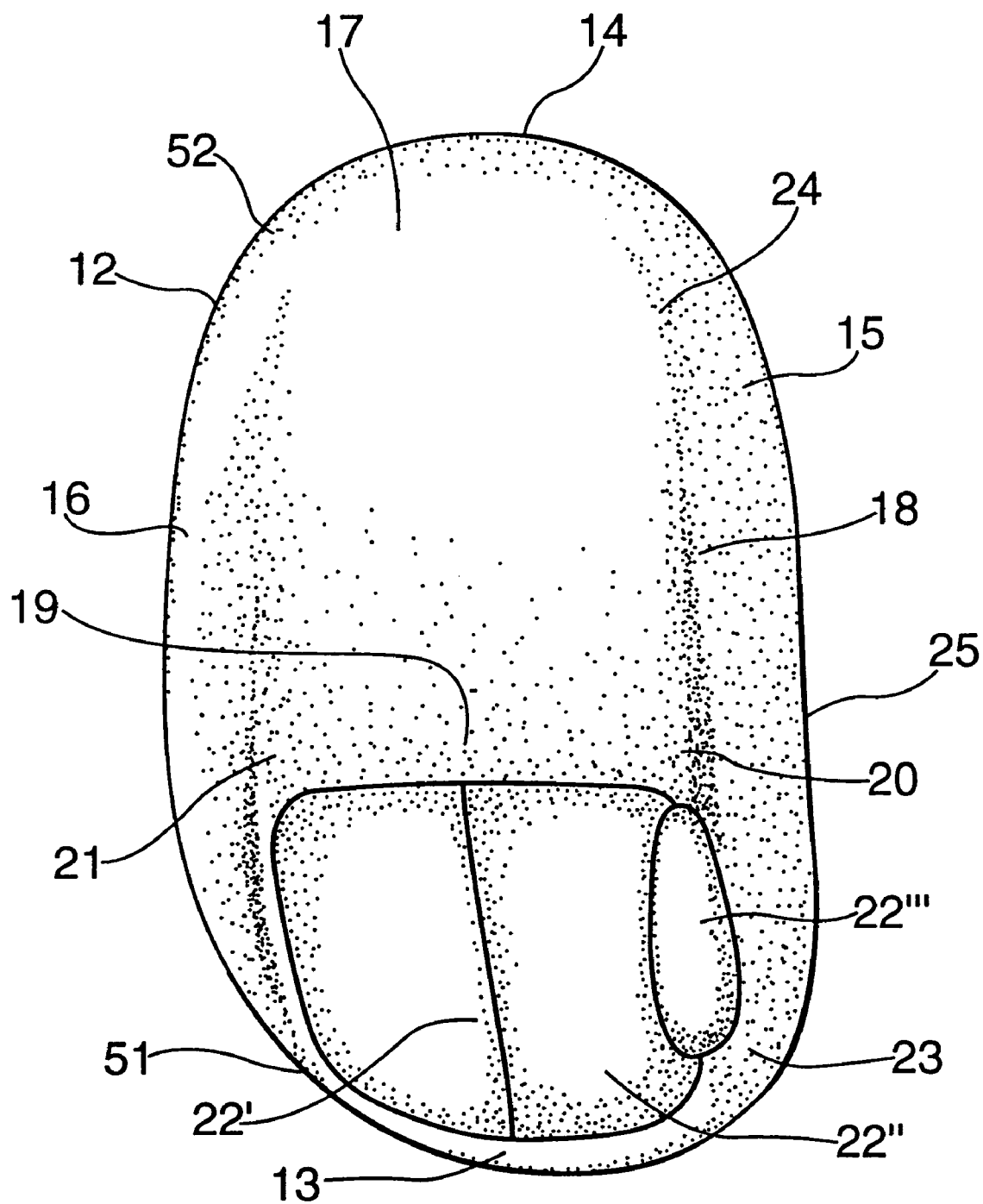
FIG. 14 is top plan view of the embodiment of FIG. 9.
Figure 15:
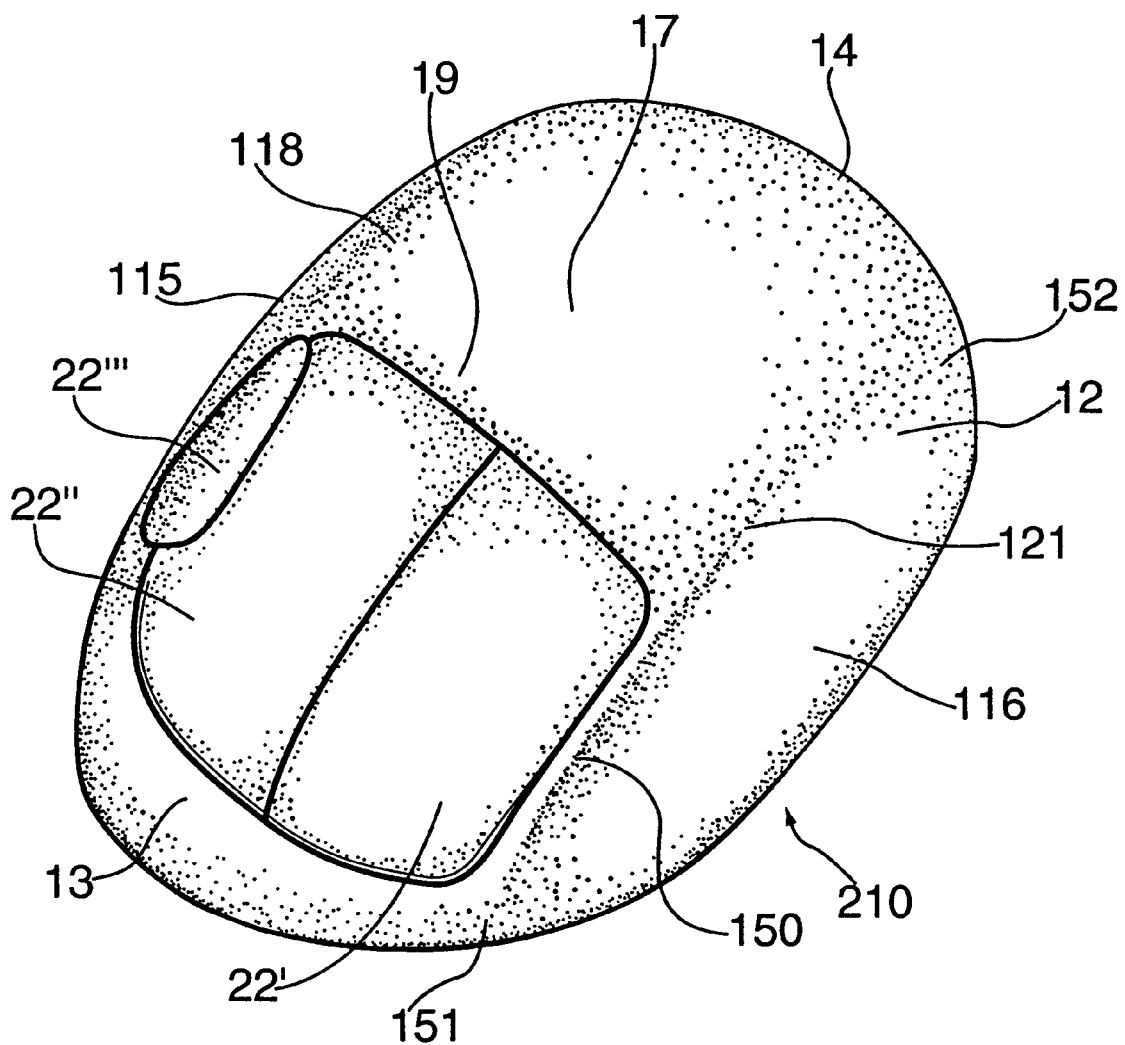
FIG. 15 is a perspective view of a left-handed version of a second embodiment in accordance with the present invention.
Figure 16:
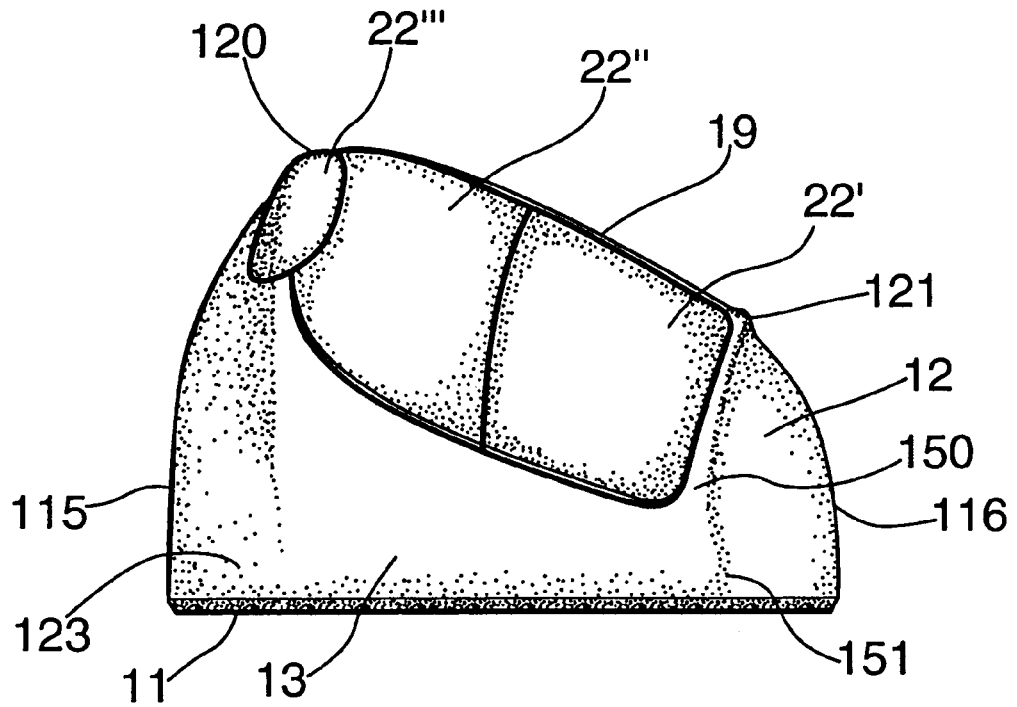
FIG. 16 is a front elevation view of the embodiment of FIG. 15.
Figure 17:
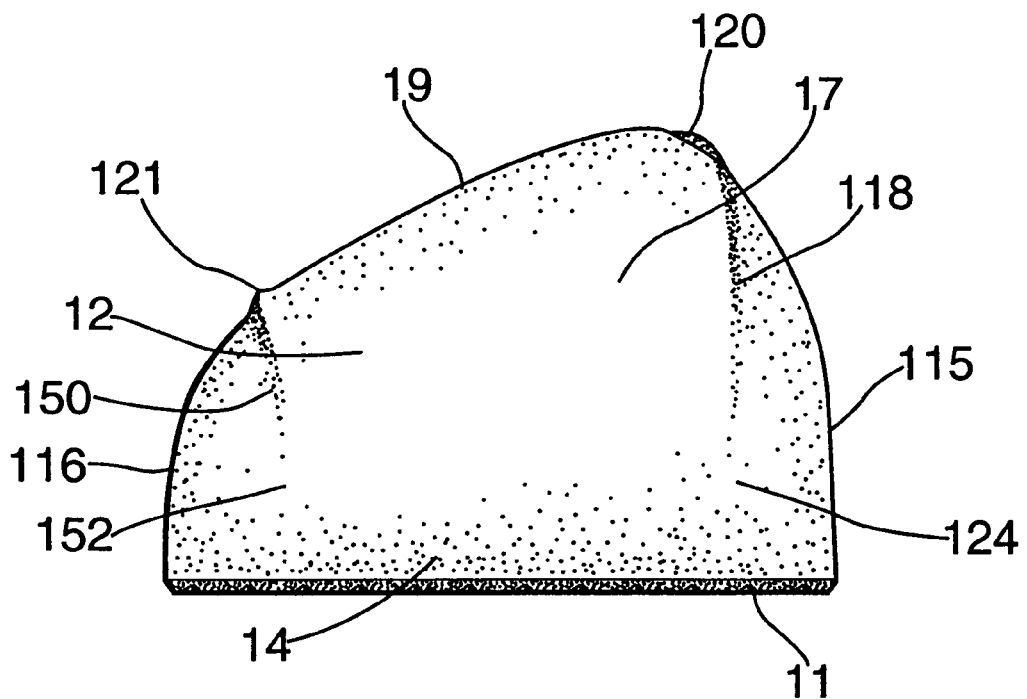
FIG. 17 is a rear elevation view of the embodiment of FIG. 15.
Figure 18:
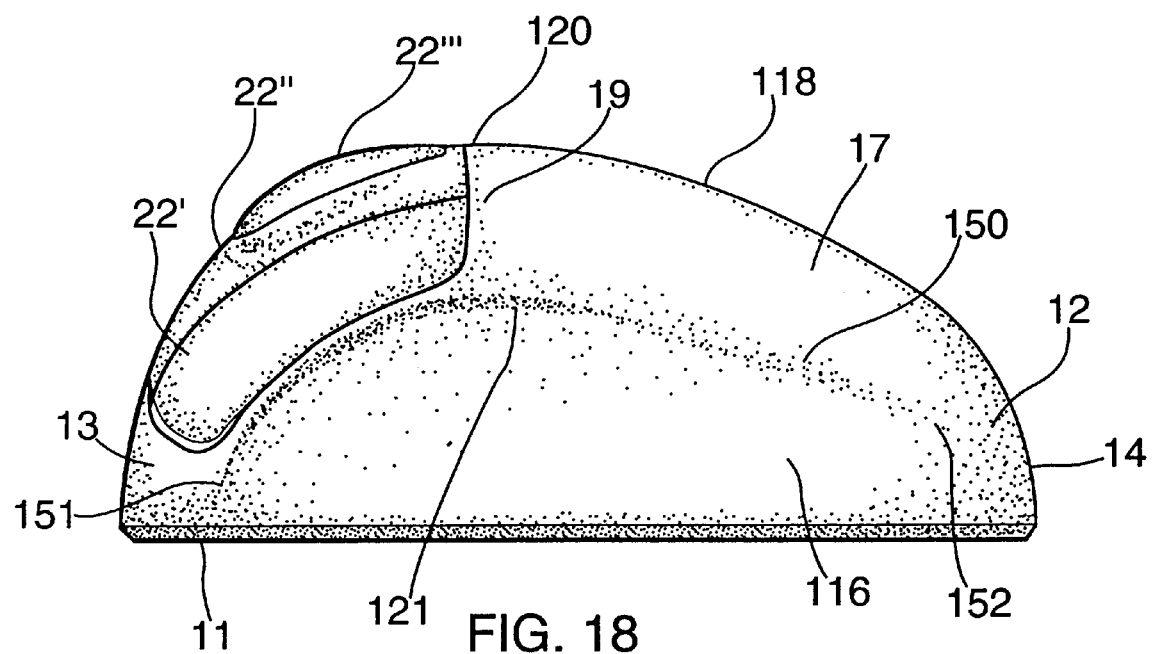
FIG. 18 is a right side elevation view of the embodiment of FIG. 15.
Figure 19:
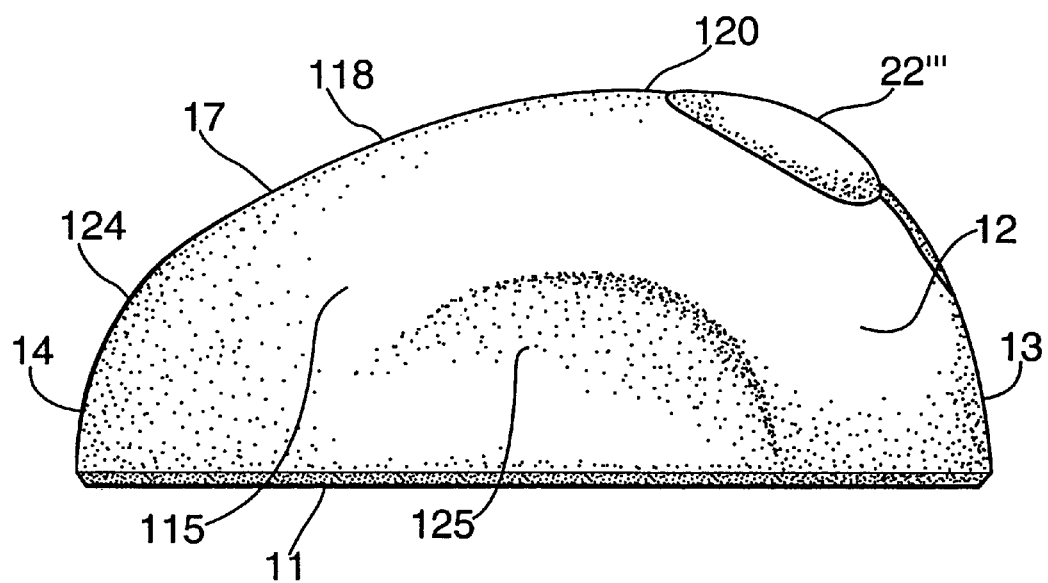
FIG. 19 is left side elevation view of the embodiment of FIG. 15.
Figure 20:
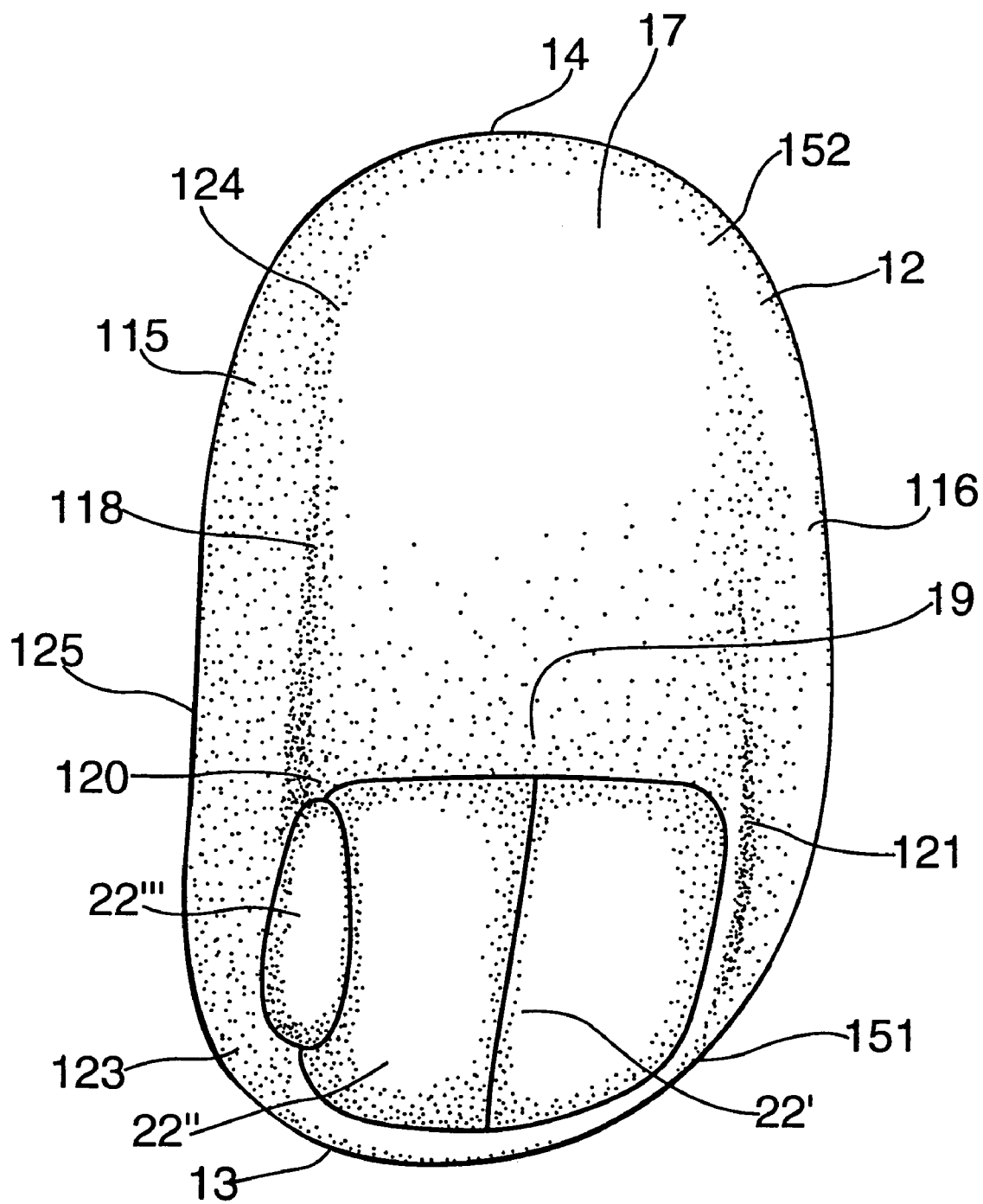
FIG. 20 is top plan view of the embodiment of FIG. 15.

As shown in FIG. 14, longitudinal peak 18 runs from approximately the juncture 23 of the bottom planar wall 11, the left surface 15 and the front surface 13 up the face of the front surface 13 and along the length of the mouse to the juncture 24 of the top surface 17, the substantially vertically rising left surface 15 and the rear surface 14. When viewed from behind, as in FIG. 11, the negative slope from left to right of the top surface ranges from 20 degrees to 30 degrees. The angle of this slope is dependent on the respective heights of the lateral sides, 15, 16 and the overall width of the housing 12. When viewed from the side as in FIG. 13, the angle of negative slope of top surface 17 from front to rear ranges from 15 degrees to 30 degrees and is dependent upon respective heights of the front surface 13 and rear surface 14 and the overall lengths of the housing 12. As shown in FIGS. 9–12, an elongated ridge 19 runs laterally from the juncture 20 of the top surface 17, the left surface 15 and front surface 13 and runs to the juncture 21 of the top surface 17, the right surface 16 and the front surface 13. The elongated ridge 19 is oriented such that it provides support for the operator's proximal phalanges.

Top surface 17, ridge 18 and ridge 19 form a support surface upon which the operator's hand can rest comfortably on the mouse with 20 degrees to 30 degrees reduced pronation, in comparison with conventional mice, to give another ergonomically advantageous grip.

Two buttons 22' and 22" are located on the substantially vertical front surface 13. These buttons 22' and 22" extend from substantially near the bottom of the front surface 13 to the front area of the top surface 17. When viewed from the front along the longitudinal axis of the mouse, as in FIG. 10, the buttons 22' and 22" are rotated approximately 0 degrees to 30 degrees in a counterclockwise direction. When viewed from the side along the lateral axis of the mouse, as in FIG. 12, the buttons 22' and 22" are rotated approximately 20 degrees to 45 degrees in a counterclockwise direction thereby sloping the buttons rearwardly. These angles may vary over the length of the buttons 22' and 22", increasing or decreasing the slope of the button from one end to the other. This orientation of the buttons allows the buttons to lie under the operator's index and middle fingers when the operator's hand is in approximately the repose position.

The embodiment of FIGS. 9–14 also includes a raised third button 22''', which is raised above the ridge 18. The third button can have a number of different functions, including that of a forward/back button. In WINDOWS 95™, the third button can be used for scrolling and panning functions. The third button can also be configured by the software used to move the cursor in the third dimension, as discussed above. Other functions of the third buttons can be contemplated by those skilled in the art, such as a "double click" feature, and can be changed depending on the software being utilized.

The third button 22''' is situated adjacent to the button 22" and along the ridge 18. This location allows actuation of the third button 22''' using either the thumb or the index finger. By allowing actuation by either the thumb or index finger, the third button 22''' prevents over-use of the thumb, which may cause injury. The third button 22''' is narrow enough to allow the buttons 22' and 22" to take most of the space along ridge 19 and to allow the ring finger to rest on the right side 16 of the mouse 110 in a relaxed posture. The third button 22''' is also elongated to facilitate its actuation by either the index finger or thumb by persons with various hand sizes and also to allow for actuation from the alternative grips discussed above.

The embodiment of FIGS. 9–14 also includes a raised ridge 50 which runs from approximately the juncture 51 of the bottom planar wall 11, the right surface 16 and the front surface 13 up the face of the front surface 13 and along the length of the mouse to the juncture 52 of the top surface 17, the right surface 16 and the rear surface 14. As can be seen particularly in FIG. 10, the raised ridge 50 is slightly raised above the level of the top surface 17 and front surface 13. This raised ridge 50 has the function of providing support for the middle finger when moving the mouse. The raised ridge 50 additionally has the function of providing a purchase for the ring finger for lifting the mouse 110 off of a surface upon which the mouse 110 rests. A common activity when using a mouse is to lift it off the surface upon which it rests. This commonly happens when the mouse reaches an end of a mouse pad or desktop upon which it rests, or encounters an obstacle, but the cursor controlled by the mouse must still be moved. To continue movement of the cursor, the user often will lift the mouse from the mousepad or desktop to a new position which allows movement of the cursor to be restarted. If the juncture between top surface 17 and right surface 16 gently curves, the gripping fingers on the right surface 16 (i.e., the ring and little fingers) which oppose the thumb on the left surface 15 when gripping the mouse 110 for lifting can slip off the mouse 110 if there is not sufficient vertical rise for those fingers. In the mouse of the embodiment of FIGS. 9–14, the little finger has sufficient rise on the right surface 16, but without the raised ridge 50, the ring finger may be on a curved surface without sufficient vertical rise. The raised ridge 50, however, provides sufficient vertical rise for the ring finger, thereby reducing the necessary force at the thumb and little fingers for gripping the mouse 110 for lifting. The raised ridge 50 eliminates the need to provide further vertical height to the right surface to allow comfortable lifting, thereby maintaining the overall ergonomic design of the mouse 110.

FIGS. 15–20 show a left-handed version of the second embodiment in accordance with the present invention as shown in FIGS. 9–14, which left-handed version is a mirror image of the right-handed version. Features common to features in the embodiments of FIGS. 1–4 and 9–14 are labeled with common reference numerals. The ergonomic computer mouse 210 of the FIGS. 15–20 includes a planar bottom wall 11 and a housing 12 extending from the bottom wall 11 approximately orthogonally oriented relative thereto. The housing 12 is defined by a front surface 13, a rear surface 14 and two rising side surfaces 115, 116. The side surfaces 115, 116 are joined to opposite lateral sides of the front surface 13 at their forward edges. The side surfaces 115, 116 are also joined to opposite lateral sides of the rear surface 14 at their rear edges. A top surface 17 is attached along its outer edge to the front 13, rear 14, and side 115, 116 surfaces along their top edge. The top surface 17 has a negative slope from right to left when viewed from behind. In addition, the top surface 17 has a negative slope from front to rear when viewed from the side.

The mouse of FIGS. 15–20 is of a smooth, curved design. The top, side, front and rear surfaces are smoothly joined together. The overall curvature of the housing 12 is such that the housing fits comfortably in the palm of the hand of the operator while providing similar ergonomically advantageous grips. These grips include a normal approach from the top, while grasping one side 115 with the thumb in opposition to the ring and little finger, which grasp the opposite side 116, and a grip wherein the operator's hand is resting on the little finger of the hand and cupping the mouse in a supported resting posture. There is a peak 118 running from front to back oriented to lie under the operator's thenar eminence providing support thereto and a surface through which the operator can push the mouse with his/her thenar eminence. The peak 118 also provides a continuous surface for the thumb to move the mouse when the operator's hand is resting on its side in the beneficial side grip position. The thumb can be moved from the desk surface up the side surface 115 as the operator's hand is rotated to rest on its side. The peak 118 gives the final purchase for the thumb in this side grip position. The side 115 has a recessed region 125 for receiving the operator's thumb. Recessed region 125 is oriented to receive the operator's thumb in both the "normal" over the top grip position and the beneficial side grip position.

A longitudinal peak 118 runs from approximately the juncture 123 of the bottom planar wall 11, the right surface 115 and the front surface 13 up the face of the front surface 13 and along the length of the mouse to the juncture 124 of the top surface 17, the substantially vertically rising right surface 115 and the rear surface 14. When viewed from behind, as in FIG. 17, the negative slope from right to left of the top surface ranges from 20 degrees to 30 degrees. The angle of this slope is dependent on the respective heights of the lateral sides, 115, 116 and the overall width of the housing 12. When viewed from the side, the angle of negative slope of top surface 17 from front to rear ranges from 15 degrees to 30 degrees and is dependent upon respective heights of the front surface 13 and rear surface 14 and the overall lengths of the housing 12. An elongated ridge 119 runs laterally from the juncture 120 of the top surface 17, the right surface 115 and front surface 13 and runs to the juncture 121 of the top surface 17, the left surface 116 and the front surface 13. The elongated ridge 119 is oriented such that it provides support for the operator's proximal phalanges.

Top surface 17, ridge 118 and ridge 119 form a support surface upon which the operator's hand can rest comfortably on the mouse with 20 degrees to 30 degrees reduced pronation, to give another ergonomically advantageous grip.

Two buttons 22' and 22" are located on the substantially vertical front surface 13. These buttons 22' and 22" extend from substantially near the bottom of the front surface 13 to the front area of the top surface 17. When viewed from the front along the longitudinal axis of the mouse, the buttons 22' and 22" are rotated approximately 0 degrees to 30 degrees in a clockwise direction. When viewed from the side along the lateral axis of the mouse, the buttons 22' and 22" are rotated approximately 20 degrees to 45 degrees in a counterclockwise direction thereby sloping the buttons rearwardly. These angles may vary over the length of the buttons 22' and 22", increasing or decreasing the slope of the button from one end to the other. This orientation of the buttons allows the buttons to lie under the operator's index and middle fingers when the operator's hand is in approximately the repose position.

The embodiment of FIGS. 15–20 also includes a raised third button 22'''. The third button can have a number of different functions, as discussed above with reference to the embodiment of FIGS. 9–14.

The third button 22''' is situated adjacent to the button 22" and along the ridge 118. This location allows actuation of the third button 22''' using either the thumb or the index finger, for the reasons discussed above with reference to the embodiment of FIGS. 9–14. The embodiment of FIGS. 15–20 also includes a raised ridge 150 which runs from approximately the juncture 151 of the bottom planar wall 11, the left surface 116 and the front surface 13 up the face of the front surface 13 and along the length of the mouse to the juncture 152 of the top surface 17, the left surface 116 and the rear surface 14. The raised ridge 150 is slightly raised above the level of the top surface 17 and front surface 13. This raised ridge 150 has the functions described above with reference to the ridge 50 of the embodiment of FIGS. 9–14.

In a preferred embodiment in accordance with the present invention, the dimensions of the mouse are: overall length of the mouse is approximately 90 to 110 mm, width of the mouse is approximately 60 to 80 mm, the maximum height of the substantially vertical left surface is approximately 40 to 52 mm, the height of the substantially vertical right surface is approximately 20 to 33 mm, the height of the substantially vertical rear surface is approximately 14 mm at its minimum to 25 mm at its maximum and the height of the substantially vertical front is approximately 5 mm at its minimum to 52 mm at its maximum. The button surfaces are approximately 42 to 58 mm wide and approximately 36 to 50 mm long with a rearward slope of approximately 20 degrees to 45 degrees. Between the right button and the right edge is approximately 0 and 12 mm of surface area.

In a most preferred embodiment in accordance with the present invention, the dimensions of the mouse are: overall length of the mouse is approximately 104 mm, width of the mouse is approximately 65 mm, the maximum height of the mouse is approximately 47 mm at the juncture of left surface and the top surface, the height of the substantially vertical right surface is approximately 27 mm, the height of the substantially vertical rear surface is approximately 16 mm and the height of the substantially vertical front surface is approximately 40 mm at the center of the mouse. The button surface is approximately 47 mm wide and approximately 40 mm long with a rearward slope of approximately 30 degrees. Between the center of the right button and the right edge is approximately 7 mm of surface area.

In a second most preferred embodiment in accordance with the present invention, the dimensions of the mouse are: overall length of the mouse is approximately 105 mm, width of the mouse is approximately 70 mm, the maximum height of the mouse is approximately 48 mm, the height of the substantially vertical right surface is approximately 24 mm, the height of the substantially vertical rear surface is approximately 18 mm and the height of the substantially vertical front surface is approximately 42 mm at the center of the mouse. The button surface is approximately 50 mm wide and approximately 41 mm long with a rearward slope of approximately 40 degrees. Between the center of the right button and the right edge is approximately 10 mm of surface area.

The above dimensions are measured at the middle of the curve where walls meet. The curves at the junctures of the side walls and the top wall are continuous and therefore the above dimensions are closest approximations.

EXAMPLE

EMG activity level studies were performed to ascertain the efficacy of the improved ergonomic mouse in relieving muscular tension. Muscles of pronation, finger abduction, finger extension and wrist extension were all monitored in mouse holding postures with three prior art mice. These results were compared with readings taken when the improved ergonomic mouse, as described in the above preferred embodiment, was used. The results are set forth in FIGS. 5–8.

Each of the four mice, three prior art mice and the improved ergonomic mouse were tested as follows: Each mouse was tested for the level of EMG activity it caused in the user's muscles in each of three positions, normal grip, resting grip and side grip. The level of EMG activity associated with hand pronation (FIG. 5), finger abduction (FIG. 6), finger extension (FIG. 7) and wrist extension (FIG. 8) was measured.

A Thought Technology EMG 201 T with a bandwidth of 25 Hz to 1 KHz was used to make the measurements. The apparatus gives continuous RMS readings. Disposable silver/silver chloride triode electrodes were used.

The muscles which were to be monitored were located by palpation when movement of the appropriate anatomical parts was instigated: Extensor digitorum longus by extending the index and middle fingers; extensor carpi ulnaris by extending the wrist; doral interosseus by abducting the index finger. Where necessary, the skin over the muscle was shaved. The triode electrodes were placed over muscles so that the active and indifferent electrodes were placed directly over and in line with the longitudinal axis of the muscle. For the pronator quadratus, the active electrodes were placed transversely across the wrist. Conductive gel was applied to the electrodes to ensure low resistance.

To obtain the static EMG reading rather than the dynamic, 4 seconds were allowed to elapse after placement of the hand on each of the mice and then the reading taken.

The subject was required to grip the four mice in random order for each of the three grips and the four muscles. Five readings were taken and averaged to construct the bar graphs.

Figure 5:
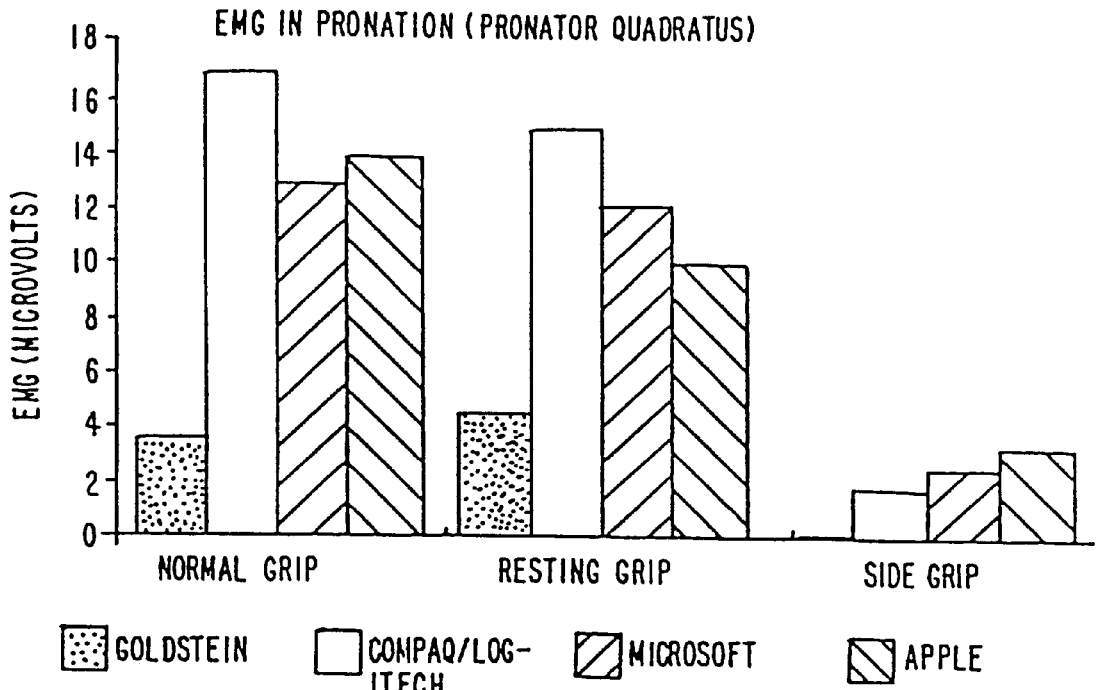
FIG. 5 is a bar graph showing comparing EMG readings associated with pronation during use of three prior art mice and an ergonomic mouse in accordance with the present invention.
Figure 6:
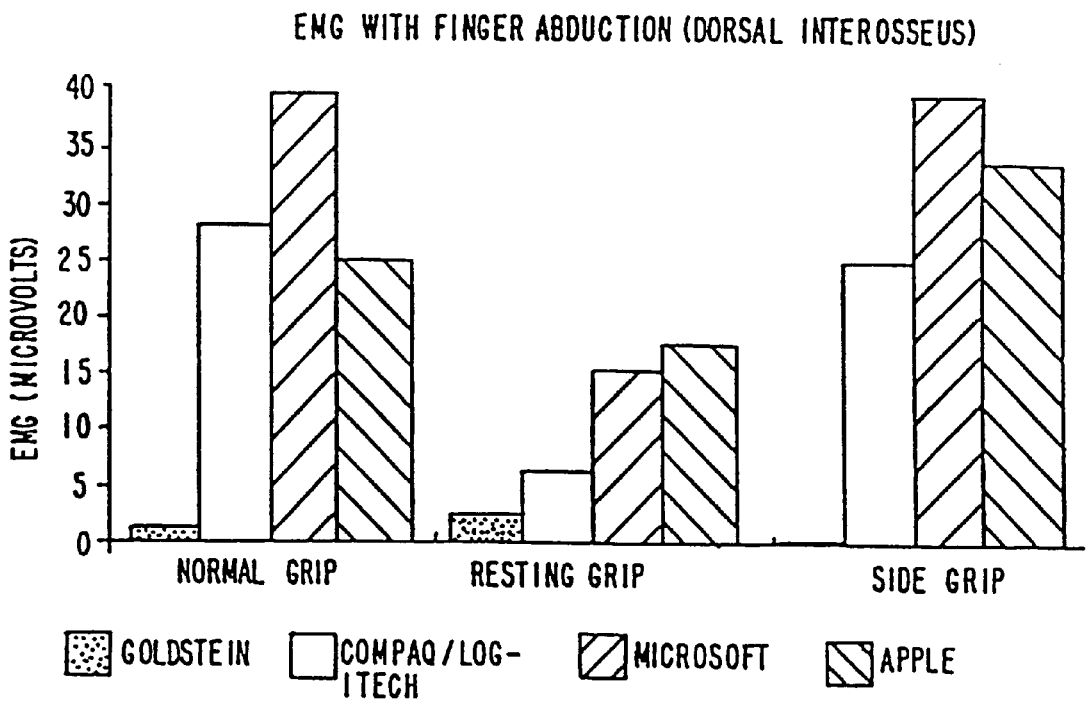
FIG. 6 is a bar graph showing comparing EMG readings associated with finger abduction during use of three prior art mice and an ergonomic mouse in accordance with present invention.
Figure 7:
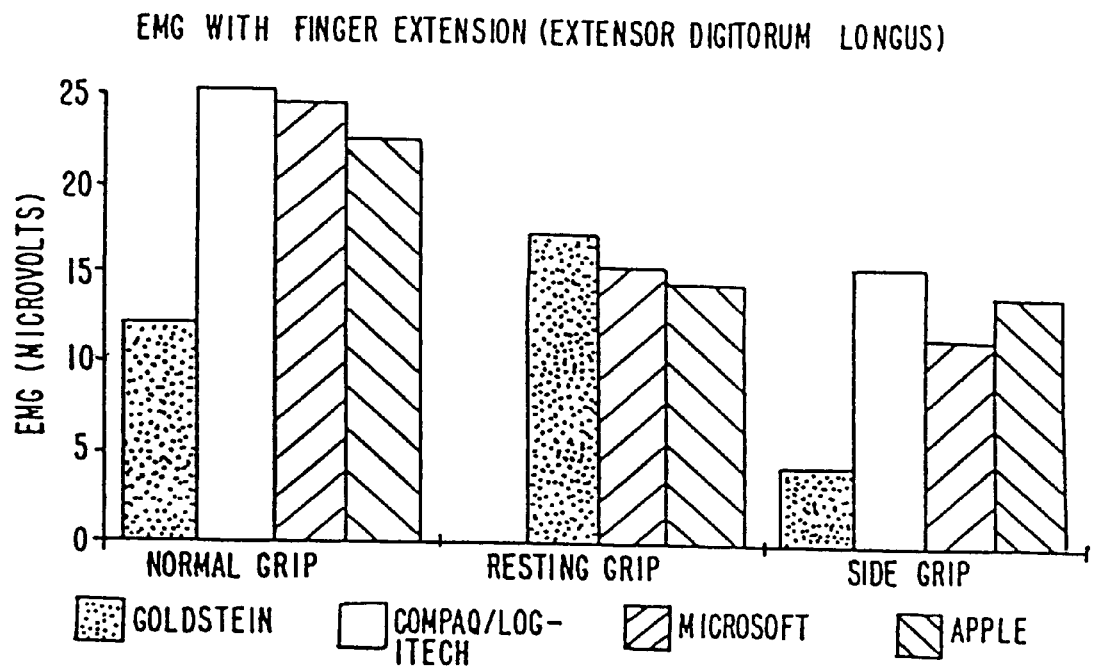
FIG. 7 is a bar graph showing comparing EMG readings associated with finger extension during use of three prior art mice and an ergonomic mouse in accordance with the present invention.
Figure 8:
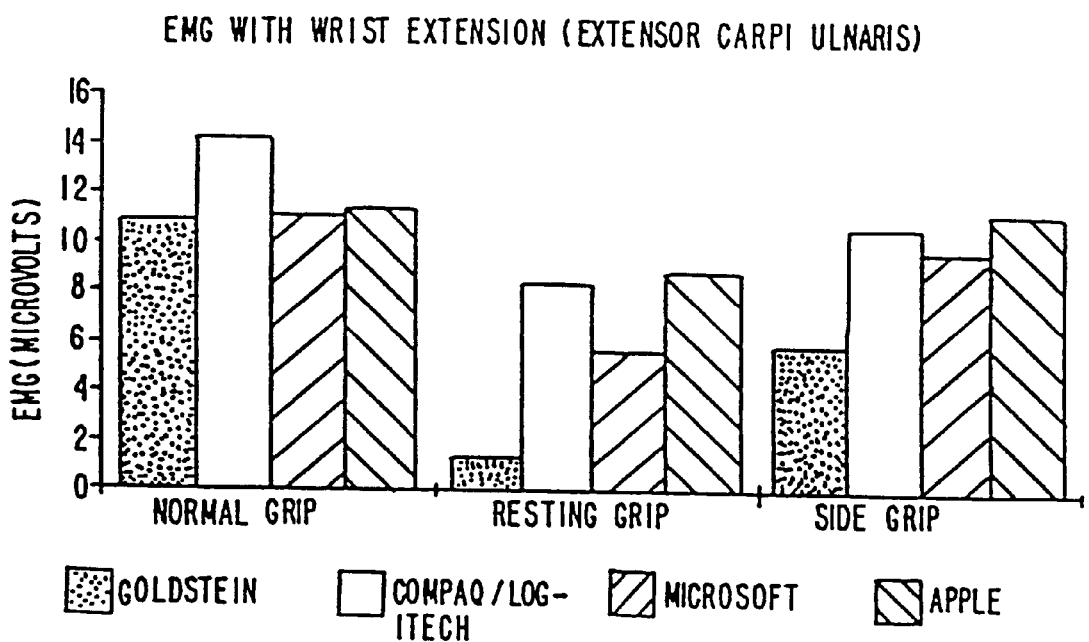
FIG. 8 is a bar graph showing comparing EMG readings associated with wrist extension during use of three prior art mice and an ergonomic mouse in accordance with the present invention.
Figure 9:
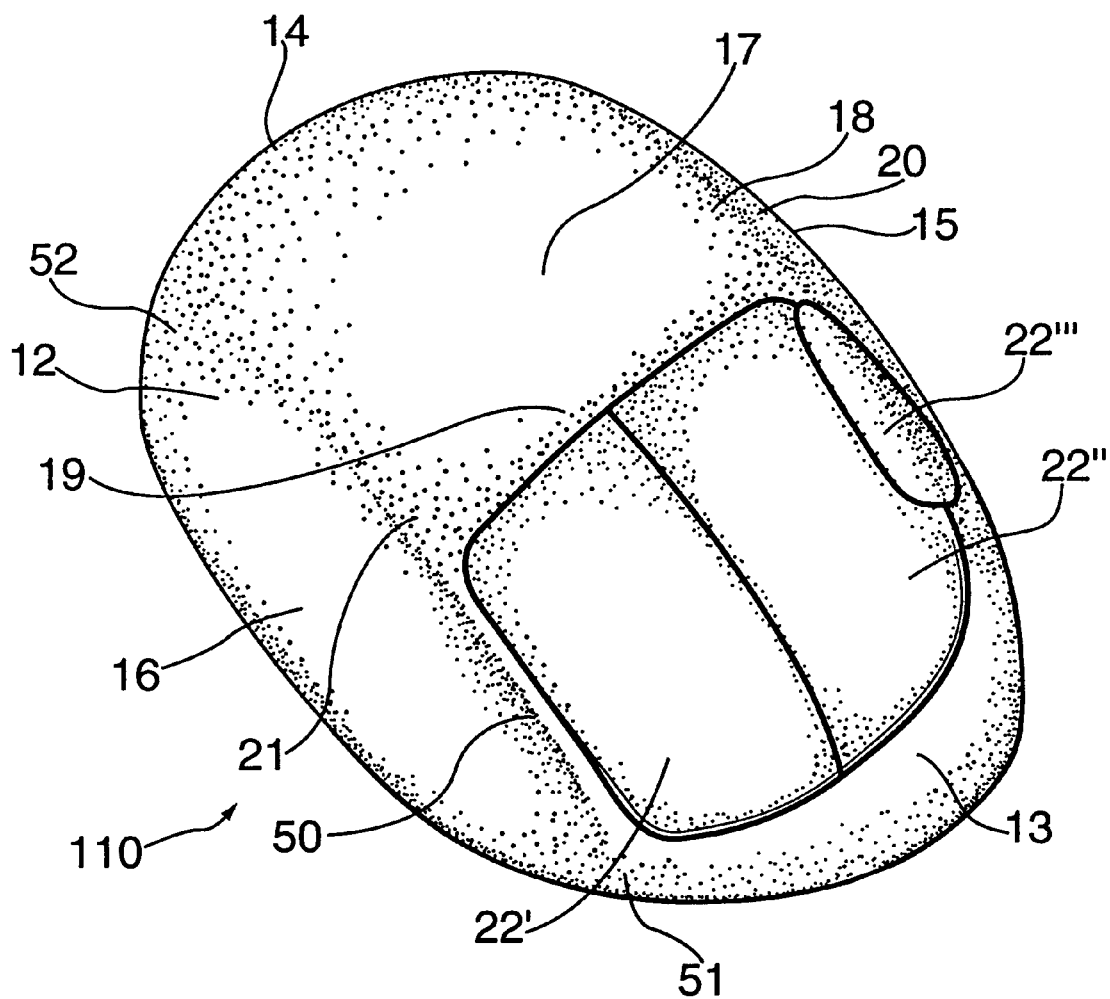
FIG. 9 is a perspective view of a right-handed version of a second embodiment in accordance with the present invention.
Figure 10:
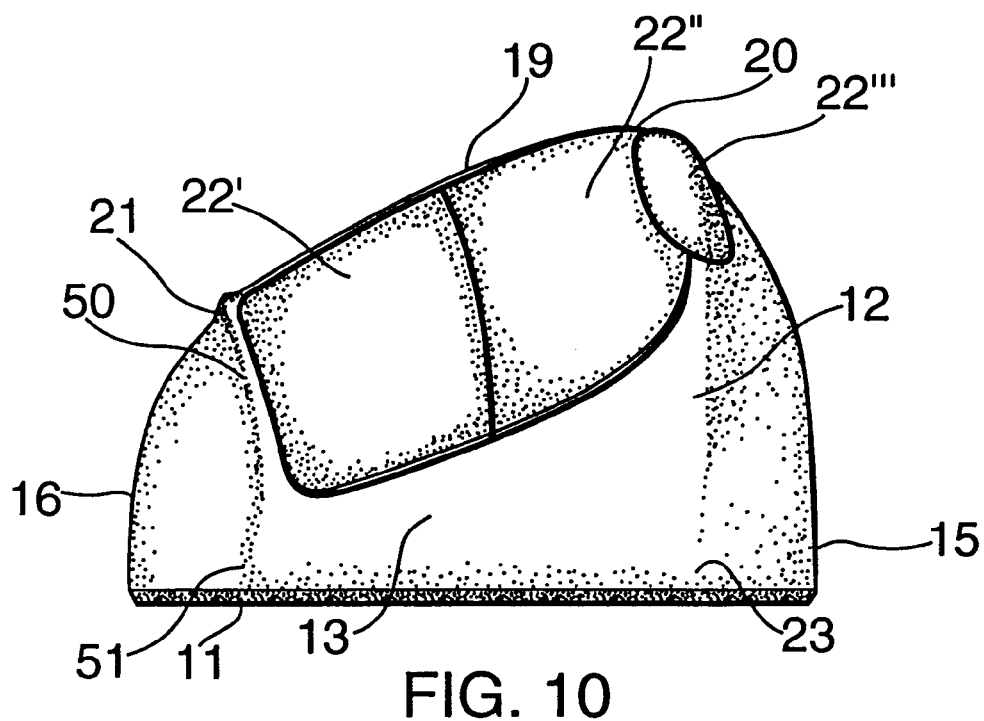
FIG. 10 is a front elevation view of the embodiment of FIG. 9.

The accompanying histograms dramatically illustrate the effectiveness of the improved ergonomic mouse in alleviating the stresses inherent in the shapes of the other prior art mice tested. In the normal grip position, wherein the operator's hand approaches the mouse over the top and moves the mouse with the fingers, the improved ergonomic mouse reduced stresses by factors ranging from 2 to 20 fold as shown in FIGS. 5, 6 and 7. The EMG levels for wrist extension, FIG. 8, in the normal grip position was not significantly different from the other mice.

The improved ergonomic mouse showed very large improvements in all muscles tested when the resting grip position was tested. Reductions in EMG activity ranged from 2 fold to over 150 fold as shown by the resting grip histograms in FIGS. 5–8.

The improved ergonomic mouse was specifically designed to allow continuous pronation relief with the resting grip position and particularly the side grip position. The other mice are not designed to allow for the side grip position, however, with some effort this grip position can be achieved with the prior art mice. For uniformity of the experiment the side grip position was utilized when the EMG measurements were made to ascertain the position's effectiveness in relieving stress. As expected, the improved ergonomic mouse improves the pronation and finger abduction EMG readings in this position as shown in the side grip histograms in FIGS. 5–8. Although, finger and wrist extension EMG readings for the improved ergonomic mouse did not show as great a reduction, FIGS. 7 and 8, over the prior art mice as were seen with the resting grip, the results were still superior to all the tested prior art mice. The three (3) prior art mice tested all showed decreased EMG activity levels when the side grip position was used, validating the necessity for the positions use. However, these prior art mice can not be easily used in this position and would possibly generate other unwanted postural and biomechanical stresses as a result of their inappropriate shapes.

In summary, the improved ergonomic mouse achieves the design criteria by: reducing the level of measured muscle EMG by up to 150 fold; allowing the shifting of static load away from fatigued muscles; improving the range of finger motion; and permitting relaxation of the entire upper limb, from the fingers to the shoulder.

While the invention has been described with reference to various embodiments, it will be understood that these embodiments are illustrative and that the scope of the invention is not limited to them. Many variations, modifications, additions, and improvements of the embodiments described are possible and will be appreciated by persons of ordinary skill in the art based on the description herein. Such variations, modifications, additions, and improvements may fall within the scope of the invention as defined in the claims that follow.

What is claimed is:

1. An ergonomic pointing device comprising:
   an upper surface contoured to support a human hand in a state of repose; and
   a low approach, generally-sloped portion of said upper surface extending downward substantially from a lateral crest thereof toward a plane defined by a resting surface, said low approach, generally-sloped portion allowing a heel of said human hand to rest on said resting surface while in said state of repose,
   said upper surface exhibiting a generally-sloped lateral profile extending downward from a substantially off-center longitudinal crest thereof toward said plane defined by said resting surface, said generally-sloped lateral profile reducing pronation of said human hand in said state of repose to between approximately 10 degrees and approximately 45 degrees from said plane defined by said resting surface.

2. An ergonomic pointing device as in claim 1,
   wherein said generally-sloped lateral profile reduces said pronation of said human hand in said state of repose to between approximately 20 degrees and approximately 30 degrees from said plane defined by said resting surface.

3. An ergonomic pointing device as in claim 1,
   wherein said human hand is a left hand;
   wherein said longitudinal crest is substantially right of center; and
   wherein said generally-sloped lateral profile is downward right-to-left.

4. An ergonomic pointing device as in claim 1,
   wherein said human hand is a right hand;
   wherein said longitudinal crest is substantially left of center; and
   wherein said generally-sloped lateral profile is downward left-to-right.

5. An ergonomic pointing device as in claim 1,
   wherein said generally-sloped lateral profile is downward at approximately 20 degrees to approximately 30 degrees from said plane defined by said resting surface.

6. An ergonomic pointing device as in claim 1,
   wherein said low approach, generally-sloped portion exhibits a negative slope of approximately 15 degrees to approximately 30 degrees from said plane defined by said resting surface.

7. An ergonomic pointing device as in claim 1, further comprising:
   a generally-sloped forward control portion of said upper surface extending downward substantially from said lateral crest toward said plane defined by said resting surface;
   at least one control positioned within said generally-sloped forward control portion,
   said generally-sloped forward control portion allowing fingers of said human hand in said state of repose to curve thereover in a relaxed rather than extended posture without activation of said at least one control.

8. An ergonomic pointing device as in claim 7,
   wherein generally-sloped forward control portion includes at least one button defined thereon; and
   wherein said upper surface provides a phalanx support at said lateral crest that, in conjunction with said downward extent of said generally-sloped forward control portion, allows said human hand in said state of repose to rest thereon without activating said at least one button.

9. An ergonomic pointing device as in claim 7,
   wherein said generally-sloped forward control portion includes plural buttons defined thereon; and
   wherein said buttons, when viewed from a front of said ergonomic pointing device along a longitudinal axis thereof, exhibit an orientation rotated counterclockwise from the vertical thereby allowing individual ones of said buttons to lie under corresponding ones of said fingers of said human hand in said state of repose.

10. An ergonomic pointing device as in claim 7,
    wherein said at least one control includes a button.

11. An ergonomic pointing device as in claim 10,
    wherein said button is conformal with said generally-sloped forward control portion of said upper surface and has sufficient extent to allow activation thereof by trigger action of a corresponding one of said of fingers of said human hand.

12. An ergonomic pointing device as in claim 10,
    wherein said button includes a curved surface thereof.

13. An ergonomic pointing device as in claim 10,
    wherein the position and orientation of said button allows activation thereof by in-line travel of a corresponding one of said of fingers of said human hand, without lateral motion.

14. An ergonomic pointing device as in claim 7,
    wherein said at least one control includes a cursor displacement device.

15. An ergonomic pointing device as in claim 14,
    wherein said cursor displacement device includes a pointing nib.

16. An ergonomic pointing device as in claim 14,
    wherein said cursor displacement device includes a forward/back actuator.

17. An ergonomic pointing device as in claim 14,
    wherein said control allows displacement control in at least one dimension.

18. An ergonomic pointing device as in claim 14,
    wherein said control allows displacement control in a depth or zoom dimension into and out of an image represented on a screen.

19. An ergonomic pointing device as in claim 14,
    wherein said control allows displacement control in at least one dimension of the plane defined by a screen.

20. An ergonomic pointing device as in claim 1,
    wherein said body portion includes a bottom wall having an opening therein to accommodate a cursor displacement device.

21. An ergonomic pointing device as in claim 20,
    wherein said cursor displacement device includes one of mechanical and optical means for indicating cursor displacement.

22. An ergonomic pointing device as in claim 7,
    wherein said at least one control device includes a selection device.

23. An ergonomic pointing device as in claim 22, wherein said selection device includes one of a button and a forward/back actuator.

24. An ergonomic pointing device as in claim 1,
    wherein said low approach, generally-sloped portion of said upper surface exhibits a convex profile when viewed along a lateral axis of said ergonomic pointing device.

25. An ergonomic pointing device as in claim 7, wherein said generally-sloped forward control portion of said upper surface exhibits a convex profile when viewed along a lateral axis of said ergonomic pointing device.

26. An ergonomic pointing device as in claim 1, wherein said generally-sloped lateral profile of said upper surface is convex.

27. An ergonomic pointing device as in claim 1, wherein said upper surface exhibits a laterally-sloped convex profile when viewed along a longitudinal axis of said ergonomic pointing device.

28. An ergonomic pointing device as in claim 1, further comprising:
a side surface extending downward substantially from said longitudinal crest toward said plane defined by said resting surface, said side surface oriented with respect to said upper surface to allow the thumb of said human hand to act in at least partial opposition to one or more fingers of said human hand on said upper surface.

29. An ergonomic pointing device as in claim 1, further comprising:
a substantially vertical side surface extending downward substantially from said longitudinal crest toward said plane defined by said resting surface.

30. An ergonomic pointing device as in claim 29, further comprising:
a thumb receiving contour defined on said substantially vertical side surface.

31. An ergonomic pointing device as in claim 29, further comprising:
a recessed region defined on said substantially vertical side surface to receive the thumb of said human hand.

32. An ergonomic pointing device as in claim 1, configured as a mouse for indicating cursor displacement in accordance with translation by said human hand across said resting surface.

33. An ergonomic pointing device comprising:
a curved, upper surface having a first negative slope downward from a substantially off-center longitudinal peak thereof, said first negative slope being in a range of approximately 20 degrees to approximately 30 degrees from the horizontal;
a rearward portion of said curved, upper surface having a second negative slope extending downward from a lateral crest thereof; and
a forward control portion of said upper surface extending downward substantially from said lateral crest and including at least one control device positioned within said control portion, said at least one control device exhibiting, when viewed from the front of said ergonomic pointing device along a longitudinal axis thereof, an orientation rotated counterclockwise from the vertical.

34. An ergonomic pointing device as in claim 33, wherein said upper surface is contoured to support a human hand in plural grip positions varying from approximately 10 degrees to approximately 80 degrees of pronation while allowing a natural curvature of fingers of said human hand over said forward control portion, thereby reducing or eliminating finger extension stresses.

35. An ergonomic pointing device as in claim 33, wherein said first and said second negative slopes define a low approach rear corner of said rearward portion of said curved, upper surface and allow a heel of a human hand to rest on an operating surface while supported in a state of approximate repose with pronation reduced to between approximately 10 degrees and approximately 40 degrees from the horizontal.

36. An ergonomic pointing device as in claim 33, wherein said side surface is substantially vertical and allows a thumb of a human hand to act in at least partial opposition to one or more fingers of said human hand on said upper surface.

37. An ergonomic pointing device as in claim 33, wherein said ergonomic pointing device is configured as a mouse for displacing a cursor in accordance with translation by a human hand across an operating surface; and
wherein said at least one control device includes a button.

38. An ergonomic pointing device as in claim 33, wherein said at least one control device includes a cursor displacement device.

39. An ergonomic pointing device as in claim 38, wherein said cursor displacement device includes a pointing nib to control displacement of a cursor in accordance with operation by a finger of a human hand.

40. An ergonomic pointing device comprising:
a top surface having a negative slope from front-to-rear in a range of approximately 15 degrees to approximately 30 degrees and from left-to-right in a range of approximately 20 degrees to approximately 30 degrees from the horizontal, said top surface providing a phalanx support toward the front thereof; and
plural buttons defined on a sloped front surface and exhibiting, when viewed from the front of said ergonomic pointing device along a longitudinal axis thereof, an orientation rotated counterclockwise from the vertical.

41. An ergonomic pointing device as in claim 40, wherein said top surface and said sloped front surface are generally curved and together define an upper surface contoured to support a human hand in a state of repose with pronation reduced from the horizontal.

42. An ergonomic pointing device as in claim 40, wherein said sloped front surface is generally curved and, in conjunction with said phalanx support, allows fingers of said human hand in said state of repose to curve thereover in a relaxed rather than extended posture without activation of said buttons.

43. An ergonomic pointing device as in claim 40, wherein said ergonomic pointing device is configured as a mouse for displacing a cursor in accordance with translation by a human hand across an operating surface.

44. An ergonomic pointing device as in claim 40, further comprising:
a cursor displacement device positioned for operation by a human hand.

45. An ergonomic pointing device as in claim 40, wherein said at least one control device includes a cursor displacement device.

46. An ergonomic pointing device as in claim 45, wherein said cursor displacement device includes a pointing nib to control displacement of a cursor in accordance with operation by a finger of a human hand.

47. A method of reducing stresses associated with operation of a pointing device, said method comprising:
providing a low approach portion of an upper surface of said pointing device, said low approach portion having negative slope downward to the side from a longitudinal peak of said upper surface and downward to the rear from a phalanx support on said upper surface and, thereby supporting a human hand in a state of approximate repose with pronation in the range of approximately 10 degrees to approximately 45 degrees from the horizontal while the heel of the human hand rests on the operating surface;

providing a generally-curved, sloped forward control surface of said pointing device; and providing at least one control within said generally-curved, sloped forward control surface, wherein said generally-curved, sloped forward control surface, in conjunction with said phalanx support, allows fingers of said human hand to curve thereover in a supported posture without activation of said at least one control, and wherein said control is positioned to allow activation in-line with travel of a respective finger of said human hand.

48. A method of reducing finger extension stresses in a human hand operating a pointing device, as in claim 47, said method further comprising:

orienting said at least one control within said generally-curved, sloped forward control surface, such that, when viewed from the front of said pointing device along a longitudinal axis thereof, said at least one control is rotated counterclockwise from the vertical.

49. A method of reducing finger extension stresses in a human hand operating a pointing device, as in claim 47, wherein said pointing device is configured as a mouse for displacing a cursor in accordance with translation by said human hand across an operating surface.

50. An ergonomic pointing device as in claim 47, wherein said at least one control includes a cursor displacement device.

51. An ergonomic pointing device as in claim 50, wherein said cursor displacement device includes a pointing nib to control displacement of a cursor in accordance with operation by a finger of said human hand.

52. A method of simultaneously reducing wrist and finger extension stresses in a human hand and limb operating a pointing device, said method comprising:

providing a low approach portion of an upper surface of said pointing device, said low approach portion having a negative slope from front-to-rear and from left-to-right, thereby allowing a heel of said human hand to rest on an operating surface;

providing phalanx support on said upper surface of said pointing device; and providing a curved, generally-sloped forward control surface of said pointing device, wherein said curved, generally-sloped forward control surface, in conjunction with said phalanx support, allows fingers of said human hand to curve thereover in a relaxed rather than extended posture.

53. A method of simultaneously reducing wrist and finger extension stresses in a human hand and limb operating a pointing device, as in claim 52, said method further comprising:

providing at least one control within said generally-curved, sloped forward control surface, wherein said generally-curved, sloped forward control surface, in conjunction with said phalanx support, allows fingers of said human hand to curve thereover in a relaxed rather than extended posture without activation of said at least one control.

54. A method of simultaneously reducing wrist and finger extension stresses in a human hand and limb operating a pointing device, as in claim 52, wherein said pointing device is configured as a mouse for displacing a cursor in accordance with translation by said human hand across an operating surface.

55. A method of simultaneously reducing wrist and finger extension stresses in a human hand and limb operating a pointing device, as in claim 53, wherein said at least one control includes a cursor displacement device.

56. A method of simultaneously reducing wrist and finger extension stresses in a human hand and limb operating a pointing device, as in claim 55, wherein said cursor displacement device includes a pointing nib to control displacement of a cursor in accordance with operation by a finger of said human hand.

57. A method of reducing pronation and supporting a human hand operating a pointing device in an approximate state of repose, said method comprising:

contouring an upper surface of said pointing device to support said human hand;

sloping a rearward portion of said upper surface downward from a phalanx support portion to define a low-approach and thereby allow a heel of said human hand to rest on an operating surface while in said approximate state of repose;

laterally sloping said upper surface and thereby supporting said human hand with pronation in the range of approximately 10 degrees to approximately 45 degrees from a plane of said operating surface; and sloping a forward control portion of said upper surface, such that, in conjunction with said phalanx support, said sloped forward control portion allows fingers of said human hand to curve thereover in a relaxed rather than extended posture.

58. A method of reducing pronation and supporting a human hand operating a pointing device in an approximate state of repose, as in claim 57, wherein said laterally sloping provides support to said human hand with pronation in the range of 20 degrees to 30 degrees from the plane of said operating surface.

59. A method of reducing pronation and supporting a human hand operating a pointing device in an approximate state of repose, as in claim 57, wherein said human hand is a left hand; and wherein said laterally sloping is downward right-to-left.

60. A method of reducing pronation and supporting a human hand operating a pointing device in an approximate state of repose, as in claim 57, wherein said human hand is a right hand; and wherein said laterally sloping is downward left-to-right.

61. A method of reducing pronation and supporting a human hand operating a pointing device in an approximate state of repose, as in claim 57, wherein said laterally sloping of said upper surface is at approximately 20 degrees to approximately 30 degrees from the plane of said operating surface.

62. A method of reducing pronation and supporting a human hand operating a pointing device in an approximate state of repose, as in claim 57, wherein said sloping of said rearward portion is at approximately 15 degrees to approximately 30 degrees from the plane of said operating surface.

63. A method of reducing pronation and supporting a human hand operating a pointing device in an approximate state of repose, as in claim 57, wherein said pointing device is configured as a mouse for displacing a cursor in accordance with translation by said human hand across said operating surface.

64. A method of reducing pronation and supporting a human hand operating a pointing device in an approximate state of repose, as in claim 57, said method further comprising:

wherein at least one control on said forward control portion includes a cursor displacement device.

65. A method of reducing pronation and supporting a human hand operating a pointing device in an approximate state of repose, as in claim 64, wherein said cursor displacement device includes a pointing nib to control displacement of a cursor in accordance with operation by a finger of said human hand.

66. A method of improving ergonomics of a pointing device, said method comprising:

contouring an upper surface of said pointing device to support a human hand in an approximate state of repose, wherein said contoured upper surface includes a negative slope from front-to-rear and from left-to-right such that said human hand in said approximate state of repose is supported with pronation in the range of 10 degrees to 45 degrees from the horizontal with a heel thereof resting on an operating surface; and defining a laterally-sloped phalanx support portion on said contoured upper surface to support fingers of said human hand at the proximal phalanges thereof; and curving and sloping a forward control portion of said upper surface to allow said fingers to curve thereover in a relaxed supported posture without activation of one or more controls provided thereon.

67. A method of improving ergonomics of a pointing device, as in claim 66, said method further comprising:

orienting said one or more controls such that, when viewed from the front of said pointing device along a longitudinal axis thereof, said one or more controls are rotated counterclockwise from the vertical and allow operation through in-line finger travel.

68. A method of improving ergonomics of a pointing device, as in claim 66, said method further comprising:

positioning and defining said one or more controls with sufficient slope, curvature and extent to allow actuation thereof by trigger action of a corresponding one or more of said fingers.

69. A method of improving ergonomics of a pointing device, as in claim 66, said method further comprising:

orienting a side surface of said pointing device with respect to said contoured upper surface to allow a thumb of said human hand to act in at least partial opposition to one or more of said fingers on said upper surface.

70. A method of improving ergonomics of a pointing device, as in claim 69, said method further comprising:

defining a thumb receiving contour on said side surface.

71. A method of improving ergonomics of a pointing device, as in claim 69, wherein said pointing device is configured as a mouse for displacing a cursor in accordance with translation by said human hand across said operating surface.

72. A method of improving ergonomics of a pointing device, as in claim 69, wherein at least one control on said forward control portion includes a cursor displacement device.

73. A method of improving ergonomics of a pointing device, as in claim 72, wherein said cursor displacement device includes a pointing nib to control displacement of a cursor in accordance with operation by a finger of said human hand.

74. A computer mouse operable by a hand of a user, the computer mouse including a plurality of buttons and movable across a flat surface to control operation of a computer, comprising:

means for supporting the hand in a state of repose during manipulation the computer mouse and such that pronation is in a range of 10 degrees to 45 degrees from the flat surface;

means for reducing stress in wrist extensors and finger extensors while manipulating the computer mouse;

means for supporting, raising and allowing curling of plural of the user's fingers thereby reducing tension of tendons; and means for receiving plural of the user's fingers in position to activate corresponding ones of the buttons by movement substantially perpendicular thereto, said movement in line with finger travel and substantially without lateral movement.

75. The computer mouse of claim 74, further comprising:

means for receiving the user's thumb in a separate plane substantially perpendicular to that of the user's fingers thereby allowing relaxation of thumb flexars and adductors.

76. The computer mouse of claim 74, further comprising:

means for receiving the user's hand in a first grip position such that during manipulation of the computer mouse, the user's hand rests on the flat surface at the side of the mouse and such that the user's thumb at least partially controls movement of the computer mouse.

77. The computer mouse of claim 74, further comprising:

means for receiving the user's hand in a second grip position such that during manipulation of the computer mouse, the user's thumb acts in opposition to the ring finger to grasp the computer mouse and the users hand is arched over the computer mouse such that said plurality of buttons are activatable by the user's index and middle fingers.

78. The computer mouse of claim 74, further comprising:

means for receiving the user's hand in a third grip position such that during manipulation of the computer mouse, the uses hand and fingers rest on the computer mouse and are supported thereby without activation of the one or more buttons, thereby facilitating relaxation of wrist extensors and finger extensors and reducing pronation to be in a range of 20 degrees to 30 degrees from the flat surface.

79. The computer mouse of claim 74, further comprising:

low approach means to allow the heel of the user's hand to rest on the flat surface thereby alleviating pressure on the user's wrist and relaxing shoulder muscles, during manipulation of the computer mouse.

80. The computer mouse of claim 74 further comprising curvature means for aligning grip of the computer mouse with cursor movement.

81. The computer mouse of claim 74 further comprising means for controlling cursor movement in three dimensions.

82. A computer mouse for operation on an operating surface by a right hand, the computer mouse comprising:

a longitudinal peak running substantially left of center along the length of said computer mouse;

a curved top surface having negative slope downward to the rear from a lateral crest thereof and to the right from said longitudinal peak to support the right hand in a state of approximate repose with pronation in the range of approximately 10 degrees to approximately 45 degrees from the horizontal while the heel of the right hand rests on the operating surface; and plural buttons having negative slope downward to the front and to the right for operation by in-line travel of respective fingers of the right hand with pronation in the range of approximately 10 degrees to approximately 45 degrees from the horizontal while the heel thereof rests on the operating surface.

83. An ergonomic computer mouse as in claim 82, wherein said lateral crest defines a phalanx support that allows the fingers of the right hand to curve thereover in a relaxed, rather than extended, posture without activation of the buttons.

84. An ergonomic pointing device for operation on an operating surface, the ergonomic pointing device comprising:

an upper surface contoured to support a human hand in a state of repose;

a low approach, generally-sloped portion of said upper surface extending downward substantially from a lateral crest thereof toward a plane defined by said operating surface, said low approach, generally-sloped portion allowing a heel of said human hand to rest on said operating surface while in said state of repose;

a generally-sloped forward control portion of said upper surface extending downward substantially from said lateral crest toward said plane defined by said operating surface; and plural controls positioned within said generally-sloped forward control portion for activation with in-line travel by respective fingers of said human hand while said heel rests on said operating surface, said upper surface exhibiting a generally-sloped lateral profile extending downward substantially from a longitudinal crest thereof toward said plane defined by said operating surface, said generally-sloped lateral profile reducing pronation of said human hand in said state of repose to between approximately 10 degrees and approximately 45 degrees from said plane defined by said operating surface.

* * * * *

UNITED STATES PATENT AND TRADEMARK OFFICE
CERTIFICATE OF CORRECTION

PATENT NO : 6,124,846
DATED : September 26, 2000
INVENTOR(S) : Mark R. Goldstein and Elizabeth Cecelia Goldstein It is certified that error appears in the above-identified patent and that said Letters Patent are hereby corrected as shown below:

Column 5, line 1, replace "this-mouse" with --this mouse--

Column 9, line 31, replace "FIGS. 14," with --FIGS. 1-4,--

Column 22, line 46, replace "uses" with --user's--

Signed and Sealed this

Third Day of April, 2001

*Attest:*

NICHOLAS P. GODICI

*Attesting Officer*   *Acting Director of the United States Patent and Trademark Office*